US012704151B2

(12) United States Patent
Fukuda et al.

(10) Patent No.: US 12,704,151 B2
(45) Date of Patent: Aug. 11, 2026

(54) SLIDING COMPONENTS

(71) Applicant: EAGLE INDUSTRY CO., LTD., Tokyo (JP)

(72) Inventors: Shogo Fukuda, Tokyo (JP); Tadatsugu Imura, Tokyo (JP); Iwa Ou, Tokyo (JP); Hiroshi Suzuki, Tokyo (JP); Kenta Uchida, Tokyo (JP); Hiroki Aizawa, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 83 days.

(21) Appl. No.: 18/287,867

(22) PCT Filed: Mar. 22, 2022

(86) PCT No.: PCT/JP2022/013242

§ 371 (c)(1), (2) Date: Oct. 20, 2023

(87) PCT Pub. No.: WO2022/224673

PCT Pub. Date: Oct. 27, 2022

(65) Prior Publication Data

US 2024/0360872 A1 Oct. 31, 2024

(30) Foreign Application Priority Data

Apr. 23, 2021 (JP) ................................ 2021-073078

(51) Int. Cl.
*F16J 15/34* (2006.01)
*F16C 33/10* (2006.01)

(52) U.S. Cl.
CPC ......... *F16C 33/107* (2013.01); *F16J 15/3416* (2013.01)

(58) Field of Classification Search
CPC .................................................... F16J 15/3416
See application file for complete search history.

(56) References Cited

U.S. PATENT DOCUMENTS 3,085,808 A 4/1963 Williams ...................... 277/388
3,232,680 A 2/1966 Clark ............................ 384/110
3,410,565 A 11/1968 Williams ...................... 277/348
(Continued)

FOREIGN PATENT DOCUMENTS

CN 2236047 Y 9/1996
CN 1364987 8/2002 .............. F16J 15/40
(Continued)

OTHER PUBLICATIONS

Definition of groove by Merriam Webster.

*Primary Examiner* — Vishal A Patel
(74) *Attorney, Agent, or Firm* — HAYES SOLOWAY P.C.

(57) ABSTRACT

Provided is a sliding component capable of maintaining high lubricity over a long period of time by efficiently using a liquid supplied between sliding surfaces. In a pair of sliding components disposed at a relatively rotating position to face each other when a rotating machine is driven, a sliding surface of the sliding component is formed on an outer peripheral edge portion and includes an opening portion extending in a circumferential direction and a fluid supply groove communicating with the opening portion and opening to a peripheral edge of the sliding surface on the side of the opening portion.

1 Claim, 14 Drawing Sheets

(56) References Cited

U.S. PATENT DOCUMENTS

| | | | | |
|---|---|---|---|---|
| 3,466,052 | A | 9/1969 | Ludwig | |
| 3,499,653 | A | 3/1970 | Gardner | 277/27 |
| 3,527,465 | A | 9/1970 | Guinard | 277/400 |
| 3,656,227 | A | 4/1972 | Weinand | 29/530 |
| 3,675,935 | A | 7/1972 | Ludwig | F16J 15/342 |
| 3,782,737 | A | 1/1974 | Ludwig | |
| 3,804,424 | A | 4/1974 | Gardner | 277/27 |
| 3,855,624 | A | 12/1974 | Reinhoudt | F16C 17/045 |
| 3,870,382 | A | 3/1975 | Reinhoudt | F16C 17/045 |
| 4,406,466 | A | 9/1983 | Geary, Jr. | 277/347 |
| 4,486,026 | A | 12/1984 | Furumura et al. | 277/80 |
| 4,523,764 | A | 6/1985 | Albers | F16J 15/342 |
| 4,645,414 | A | 2/1987 | DeHart | F04D 17/161 |
| 5,092,612 | A | 3/1992 | Victor | 277/400 |
| 5,133,562 | A | 7/1992 | Lipschitz | F16J 15/342 |
| 5,201,531 | A | 4/1993 | Lai | F16J 15/3412 |
| 5,222,743 | A | 6/1993 | Goldswain | 277/400 |
| 5,385,409 | A | 1/1995 | Ide | F16J 15/3432 |
| 5,441,283 | A | 8/1995 | Pecht et al. | 277/96.1 |
| 5,447,316 | A | 9/1995 | Matsui | F16J 15/34 |
| 5,492,341 | A * | 2/1996 | Pecht | F16J 15/3412 384/123 |
| 5,496,047 | A | 3/1996 | Goldswain | F16J 15/3412 |
| 5,498,007 | A * | 3/1996 | Kulkarni | F16J 15/3412 277/408 |
| 5,501,470 | A | 3/1996 | Fuse | 277/400 |
| 5,529,318 | A | 6/1996 | Fuse | F16J 15/3412 |
| 5,556,111 | A | 9/1996 | Sedy | 277/96.1 |
| 5,605,339 | A | 2/1997 | Pecht | F16J 15/3412 |
| 5,664,787 | A | 9/1997 | Fuse et al. | F16J 15/34 |
| 5,702,110 | A | 12/1997 | Sedy | |
| 5,895,051 | A | 4/1999 | Bowers | B62D 5/22 |
| 6,142,478 | A | 11/2000 | Pecht | F16J 15/3484 |
| 6,189,896 | B1 | 2/2001 | Dickey et al. | F16L 17/06 |
| 6,446,976 | B1 | 9/2002 | Key | 277/367 |
| 6,575,470 | B1 | 6/2003 | Gacek | F16J 15/3412 |
| 6,817,766 | B2 | 11/2004 | Gomyo | F16C 32/06 |
| 7,044,470 | B2 | 5/2006 | Zheng | F16J 15/342 |
| 7,510,330 | B2 | 3/2009 | Obara | F16C 32/06 |
| 7,568,839 | B2 | 8/2009 | Gotoh et al. | F16C 32/06 |
| 7,744,094 | B2 | 6/2010 | Yanagisawa | F16J 15/342 |
| 7,758,051 | B2 | 7/2010 | Roberts-Haritonov et al. | F16J 15/34 |
| 7,780,399 | B1 | 8/2010 | Garrison | F01D 25/183 |
| 8,162,322 | B2 | 4/2012 | Flaherty | F16J 15/3412 |
| 9,062,775 | B2 | 6/2015 | Short et al. | F16J 15/34 |
| 9,353,865 | B2 | 5/2016 | Lattin | F16N 21/00 |
| 9,353,867 | B2 | 5/2016 | Itadani | F16J 15/342 |
| 9,371,912 | B2 | 6/2016 | Hosoe et al. | F16J 15/34 |
| 9,587,745 | B2 | 3/2017 | Itadani et al. | F16J 15/3412 |
| 9,611,938 | B1 | 4/2017 | Itadani | F16J 15/3416 |
| 9,677,670 | B2 | 6/2017 | Itadani et al. | F16J 15/34 |
| 9,829,109 | B2 | 11/2017 | Itadani et al. | F16J 15/3412 |
| 9,845,886 | B2 | 12/2017 | Itadani | F16C 17/045 |
| 9,951,873 | B2 | 4/2018 | Inoue et al. | F16J 15/34 |
| 9,964,216 | B2 | 5/2018 | Inoue et al. | F16J 15/3424 |
| 9,982,784 | B2 | 5/2018 | Osada et al. | F16J 15/34 |
| 10,054,230 | B2 | 8/2018 | Katori | F16J 15/34 |
| 10,072,759 | B2 | 9/2018 | Inoue et al. | F16J 15/34 |
| 10,113,648 | B2 | 10/2018 | Inoue et al. | F16J 15/342 |
| 10,190,689 | B2 | 1/2019 | Yoshida | F16J 15/3412 |
| 10,337,560 | B2 | 7/2019 | Takunaga | F16C 33/80 |
| 10,337,620 | B2 | 7/2019 | Tokunaga et al. | F16J 15/342 |
| 10,352,450 | B2 | 7/2019 | Yamanaka et al. | F16J 15/3204 |
| 10,408,349 | B2 | 9/2019 | Miyazaki | F16J 15/3272 |
| 10,473,220 | B2 | 11/2019 | Tokunaga et al. | F16J 15/34 |
| 10,487,944 | B2 | 11/2019 | Itadani | F16J 15/3496 |
| 10,487,948 | B2 | 11/2019 | Inoue et al. | F16J 15/342 |
| 10,495,228 | B2 | 12/2019 | Itadani et al. | F16J 15/34 |
| 10,648,569 | B2 | 5/2020 | Itadani | F16K 15/34 |
| 10,655,736 | B2 | 5/2020 | Itadani | F16J 15/3416 |
| 10,704,417 | B2 | 7/2020 | Tokunaga et al. | F01D 25/16 |
| 10,781,924 | B2 | 9/2020 | Inoue et al. | F16J 15/342 |
| 10,883,603 | B2 | 1/2021 | Inoue et al. | F16J 15/342 |
| 10,883,604 | B2 | 1/2021 | Inoue et al. | F16J 15/342 |
| 11,009,072 | B2 | 5/2021 | Kimura et al. | F16J 15/34 |
| 11,009,130 | B2 | 5/2021 | Itadani | F16J 15/3284 |
| 11,053,974 | B2 | 7/2021 | Negishi et al. | F16C 17/026 |
| 11,125,335 | B2 | 9/2021 | Kimura et al. | F16J 15/34 |
| 11,221,071 | B2 | 1/2022 | Sasaki | F16C 17/04 |
| 11,525,512 | B2 | 12/2022 | Kimura | F16J 15/3412 |
| 11,530,749 | B2 | 12/2022 | Kimura | F16J 15/441 |
| 11,603,934 | B2 | 3/2023 | Imura | F16J 15/3412 |
| 11,644,100 | B2 | 5/2023 | Kimura | F16J 15/324 |
| 11,892,081 | B2 | 2/2024 | Inoue et al. | F16J 15/3412 |
| 2002/0093141 | A1 | 7/2002 | Wang | 277/358 |
| 2003/0178781 | A1 | 9/2003 | Tejima | |
| 2003/0189294 | A1 | 10/2003 | Tejima | F16J 15/34 |
| 2004/0080112 | A1 | 4/2004 | Tejima | 277/306 |
| 2005/0135714 | A1 | 6/2005 | Rahman | F16C 17/107 |
| 2005/0141789 | A1 | 6/2005 | Kita et al. | F16C 32/06 |
| 2005/0212217 | A1 | 9/2005 | Tejima | 277/399 |
| 2006/0093245 | A1 | 5/2006 | Han | G11B 19/2018 |
| 2007/0296156 | A1 | 12/2007 | Yanagisawa et al. | F16J 15/34 |
| 2008/0100001 | A1 | 5/2008 | Flaherty | 277/400 |
| 2008/0272552 | A1 | 11/2008 | Zheng | 277/400 |
| 2010/0066027 | A1 | 3/2010 | Vasagar | 277/350 |
| 2011/0101616 | A1 | 5/2011 | Teshima | 277/358 |
| 2012/0018957 | A1 | 1/2012 | Watanabe | 277/387 |
| 2013/0209011 | A1 | 8/2013 | Tokunaga | F16C 32/0633 |
| 2014/0203517 | A1 | 7/2014 | Ferris | F16K 15/3412 |
| 2015/0115537 | A1 | 4/2015 | Tokunaga | F16J 15/34 |
| 2015/0115540 | A1 | 4/2015 | Tokunaga | F16J 15/34 |
| 2015/0123350 | A1 | 5/2015 | Itadani | 277/400 |
| 2015/0184752 | A1 | 7/2015 | Itadani | F16J 15/3412 |
| 2015/0226334 | A1 | 8/2015 | Itadani | F16J 15/342 |
| 2015/0240950 | A1 | 8/2015 | Takahashi | F16J 15/363 |
| 2015/0260292 | A1 | 9/2015 | Inoue et al. | F16J 15/342 |
| 2015/0377297 | A1 | 12/2015 | Tokunaga et al. | F16C 33/748 |
| 2015/0377360 | A1 | 12/2015 | Itadani | F16J 15/3412 |
| 2016/0003361 | A1 | 1/2016 | Takahashi | F16J 15/3408 |
| 2016/0033045 | A1 | 2/2016 | Itadani et al. | F16J 15/3412 |
| 2016/0097457 | A1 | 4/2016 | Sun et al. | F16J 15/34 |
| 2016/0252182 | A1 | 9/2016 | Itadani et al. | F16J 15/34 |
| 2017/0009889 | A1 | 1/2017 | Seki | F16J 15/3272 |
| 2017/0114902 | A1 | 4/2017 | Itadani | F16J 15/3412 |
| 2017/0130844 | A1 | 5/2017 | Itadani | F16J 15/3412 |
| 2017/0167615 | A1 | 6/2017 | Itadani | F16J 15/3412 |
| 2017/0198814 | A1 | 7/2017 | Colombo et al. | F16J 15/3412 |
| 2017/0234431 | A1 | 8/2017 | Katori et al. | F16J 15/3412 |
| 2017/0241549 | A1 | 8/2017 | Itadani | F16J 15/40 |
| 2018/0051809 | A1 | 2/2018 | Yoshida | F16H 15/3412 |
| 2018/0058584 | A1 | 3/2018 | Miyazaki | F16J 15/164 |
| 2018/0073394 | A1 | 3/2018 | Tokunaga et al. | F01D 25/183 |
| 2018/0128377 | A1 | 5/2018 | Tokunaga et al. | F16J 15/342 |
| 2018/0128378 | A1 | 5/2018 | Tokunaga et al. | F16J 15/342 |
| 2018/0135699 | A1 | 5/2018 | Takunaga | F16J 15/348 |
| 2018/0187785 | A1 | 7/2018 | Katori et al. | F16J 15/34 |
| 2018/0195618 | A1 | 7/2018 | Itadani | F16J 15/342 |
| 2019/0178386 | A1 | 6/2019 | Arai | F16J 15/3496 |
| 2019/0301522 | A1 | 10/2019 | Negishi et al. | F16C 17/026 |
| 2019/0376558 | A1 | 12/2019 | Kimura | F16C 33/743 |
| 2020/0182299 | A1 | 6/2020 | Kimura | F16C 17/026 |
| 2021/0054935 | A1 | 2/2021 | Kimura | F16J 15/3412 |
| 2021/0080006 | A1 | 3/2021 | Sasaki | F16J 15/34 |
| 2021/0116029 | A1 | 4/2021 | Kimura | F16J 15/324 |
| 2021/0116030 | A1 | 4/2021 | Kimura | |
| 2021/0116032 | A1 | 4/2021 | Kimura | F16J 15/188 |
| 2021/0164571 | A1 | 6/2021 | Kimura | F16J 15/3412 |
| 2022/0010835 | A1 | 1/2022 | Inoue | F16C 17/045 |
| 2022/0099191 | A1 | 3/2022 | Suzuki | F16C 33/103 |
| 2022/0145992 | A1 | 5/2022 | Miyazaki | F16C 33/107 |
| 2022/0275828 | A1 | 9/2022 | Inoue | F16J 15/3424 |
| 2023/0258184 | A1 | 8/2023 | Suzuki | F04C 29/00 |

FOREIGN PATENT DOCUMENTS

| | | | |
|---|---|---|---|
| CN | 2534429 | 2/2003 | F16J 15/40 |
| CN | 1401924 | 3/2003 | F16J 15/16 |
| CN | 101749431 | 6/2010 | F16J 15/34 |
| CN | 101776152 | 7/2010 | F16J 15/48 |
| CN | 201582390 | 9/2010 | F16J 15/16 |
| CN | 103267132 | 8/2013 | F16J 15/54 |
| CN | 103732958 | 4/2014 | F16J 15/34 |

(56) References Cited

FOREIGN PATENT DOCUMENTS

| | | | |
|---|---|---|---|
| CN | 103791097 | 5/2014 | F16J 15/34 |
| CN | 104019237 | 9/2014 | F16J 15/16 |
| CN | 104165229 | 11/2014 | F16J 15/40 |
| CN | 105683632 | 6/2016 | F04D 29/10 |
| CN | 106439037 | 2/2017 | F16J 15/34 |
| CN | 206017723 | 3/2017 | F16J 15/34 |
| CN | 107166036 | 9/2017 | F16J 15/16 |
| CN | 107532724 | 1/2018 | F16J 15/34 |
| CN | 107676484 | 2/2018 | F16J 15/3232 |
| CN | 108506494 | 9/2018 | F16J 15/34 |
| DE | 3619489 | 12/1987 | F16J 15/34 |
| DE | 4407453 | 9/1995 | F16C 17/08 |
| EP | 0637706 | 8/1993 | F16J 15/34 |
| EP | 0896163 | 2/1999 | F16C 33/10 |
| EP | 2520835 | 11/2012 | F16J 15/34 |
| EP | 2626604 | 8/2013 | F16J 15/34 |
| EP | 2977655 | 1/2016 | F16J 15/34 |
| EP | 3091258 | 11/2016 | F16J 15/34 |
| EP | 3163134 A1 | 5/2017 | |
| EP | 3299686 | 3/2018 | F16J 15/34 |
| EP | 3514414 | 7/2019 | F16J 15/34 |
| EP | 3922872 | 12/2021 | F16J 15/34 |
| EP | 3926187 | 12/2021 | F16C 17/04 |
| EP | 3926188 | 12/2021 | F16C 17/04 |
| EP | 3943765 | 1/2022 | F16C 17/04 |
| GB | 1509482 | 5/1978 | F16C 33/10 |
| JP | 36-6305 | 5/1961 | |
| JP | S49-33614 | 9/1974 | F16J 15/34 |
| JP | S54-77305 | 6/1979 | B06B 9/10 |
| JP | S55-177549 | 12/1980 | F16J 15/16 |
| JP | S57-146955 | 9/1982 | F16J 15/34 |
| JP | 58-109771 | 6/1983 | F16J 15/34 |
| JP | 58-137667 | 8/1983 | F16J 15/40 |
| JP | S59-58252 | 4/1984 | F16J 15/34 |
| JP | S60-107461 | 7/1985 | B63H 23/36 |
| JP | S6182177 | 5/1986 | F16J 15/34 |
| JP | S62-37572 | 2/1987 | F16J 51/34 |
| JP | S63-033027 | 3/1988 | F16C 33/46 |
| JP | S63-190975 | 8/1988 | F16J 15/34 |
| JP | H01133572 | 9/1989 | F16J 15/34 |
| JP | 2-236067 | 9/1990 | F16J 15/34 |
| JP | 3-14371 | 2/1991 | F16J 15/34 |
| JP | 3-35372 | 4/1991 | F16J 15/34 |
| JP | 3-41267 | 4/1991 | F16J 15/34 |
| JP | 3-41268 | 4/1991 | F16J 15/34 |
| JP | H04-73 | 1/1992 | F16J 15/34 |
| JP | H04-145267 | 5/1992 | F16J 15/34 |
| JP | H04-96671 | 8/1992 | F16J 15/34 |
| JP | H05-90048 | 12/1993 | F16J 15/34 |
| JP | H05-322050 | 12/1993 | F16J 15/34 |
| JP | H07-55016 | 3/1995 | F16J 15/34 |
| JP | H08-89489 | 4/1996 | A61B 5/05 |
| JP | H09-503276 | 3/1997 | F16J 15/34 |
| JP | H09-329247 | 12/1997 | F16J 15/34 |
| JP | H10-38093 | 2/1998 | F16J 15/34 |
| JP | H10-281299 | 10/1998 | F16J 15/34 |
| JP | 2000-179543 | 6/2000 | F16C 17/10 |
| JP | 2001-295833 | 10/2001 | F16C 17/04 |
| JP | 2001-317638 | 11/2001 | F16J 15/34 |
| JP | 2003-161322 | 6/2003 | F16C 33/10 |
| JP | 2003-343741 | 12/2003 | F16J 15/34 |
| JP | 2004-003578 | 1/2004 | F16J 15/34 |
| JP | 2005-188651 | 7/2005 | F16J 15/34 |
| JP | 2005-58051 | 12/2005 | F16C 33/74 |
| JP | 2006-9828 | 1/2006 | F16C 17/02 |
| JP | 2006-022834 | 1/2006 | F16J 15/34 |
| JP | 2006-77899 | 3/2006 | F16J 15/34 |
| JP | 2008-144864 | 6/2008 | F16C 33/10 |
| JP | 2009-250378 | 10/2009 | F16J 15/34 |
| JP | 2010-133496 | 6/2010 | F16J 15/34 |
| JP | 2010-216587 | 9/2010 | F16J 15/34 |
| JP | 2011-185292 | 9/2011 | F16J 15/34 |
| JP | 2011-196429 | 10/2011 | F16J 15/34 |
| JP | 2012-2295 | 1/2012 | F16J 15/34 |
| JP | 5271858 | 5/2013 | F16J 15/34 |
| JP | WO2014042045 | 3/2014 | F16J 15/34 |
| JP | 2016-80090 | 5/2016 | F16J 15/34 |
| JP | 2017-053423 | 3/2017 | F16J 15/10 |
| JP | 2017-141961 | 8/2017 | F16J 15/34 |
| JP | 6444492 | 12/2018 | F16J 15/34 |
| JP | 2019-13446 | 1/2019 | A47J 27/00 |
| JP | 2019-15401 | 1/2019 | F16J 15/34 |
| JP | 2019-173953 | 10/2019 | F04D 29/12 |
| JP | 2019-173955 | 10/2019 | F04D 29/12 |
| JP | 2019-173956 | 10/2019 | F04D 29/12 |
| JP | 2020-173020 | 10/2020 | F16C 33/74 |
| WO | WO9506832 | 3/1995 | F16J 15/34 |
| WO | WO2012046749 | 4/2012 | F16J 15/34 |
| WO | WO2014024742 | 2/2014 | F16J 15/34 |
| WO | WO2014050920 | 4/2014 | F16J 15/34 |
| WO | WO2014103630 | 7/2014 | F16J 15/34 |
| WO | WO2014103631 | 7/2014 | F16J 15/34 |
| WO | WO2014112455 | 7/2014 | F16J 15/34 |
| WO | WO2014148316 | 9/2014 | F16J 15/34 |
| WO | WO2014174725 | 10/2014 | F16J 15/34 |
| WO | WO2016009408 | 1/2016 | F16J 15/34 |
| WO | WO2016035860 | 3/2016 | F16J 15/34 |
| WO | WO2016167262 | 10/2016 | F16J 15/34 |
| WO | WO2016186019 | 11/2016 | F16J 15/34 |
| WO | WO2016203878 | 12/2016 | F16J 15/34 |
| WO | WO2017002646 | 1/2017 | F16J 15/34 |
| WO | WO2017002774 | 1/2017 | F16J 15/34 |
| WO | WO2018034197 | 2/2018 | F16J 15/34 |
| WO | WO2018105505 | 6/2018 | F16J 15/34 |
| WO | WO2018139231 | 8/2018 | F16J 15/34 |
| WO | WO2018139232 | 8/2018 | F16C 33/10 |
| WO | WO2021020074 | 2/2021 | F16C 17/04 |

* cited by examiner

CROSS-SECTIONAL VIEW OF A-A

CROSS-SECTIONAL VIEW OF B-B

SLIDING COMPONENTS

TECHNICAL FIELD

The present invention relates to sliding components that rotate relative to each other and are used for, for example, a shaft sealing device sealing a rotating shaft of a rotating machine in automobiles, general industrial machines, or other seal fields or a bearing of a rotating machine in automobiles, general industrial machines, or other bearing fields.

BACKGROUND ART

Conventionally, a lubricant is applied between sliding surfaces of a pair of sliding components that rotates relative to each other to reduce friction. For example, a mechanical seal (for example, see Patent Citation 1) is known as a sliding component used in a shaft sealing device that seals a rotating shaft of a rotating machine of a pump, a turbine, or the like and prevents a leakage of a sealed fluid.

The mechanical seal includes a stationary seal ring and a rotating seal ring as sliding components. The mechanical seal has a configuration in which sliding surfaces of the stationary seal ring and the rotating seal ring are slidable while being in press contact with each other and can seal a gap between the sliding surfaces. For such a mechanical seal, it is particularly important to maintain lubricity over a long period of time in order to prevent wear due to sliding between the sliding surfaces while maintaining sealing performance.

If the sealed fluid or the leakage side fluid is a liquid such as oil, the stationary seal ring and the rotating seal ring can use the liquid for lubrication by infiltrating the liquid between the sliding surfaces. On the other hand, if the sealed fluid or the leakage side fluid is gas, the stationary seal ring and the rotating seal ring cannot maintain satisfactory lubricity over a long period of time since the lubricant applied between the sliding surfaces is pushed out from between the sliding surfaces over time due to the relative rotation of the stationary seal ring and the rotating seal ring. Therefore, it has been attempted widely to maintain lubricity between the sliding surfaces by supplying a dropped liquid between the sliding surfaces in the stationary seal ring and the rotating seal ring used in such an environment.

CITATION LIST

Patent Literature

Patent Citation 1: JP 2017-53423 A (Page 4, FIG. 1)

SUMMARY OF INVENTION

Technical Problem

However, since the liquid dropped to any one edge portion on the inner radial side and the outer radial side of the sliding surface is difficult to be guided toward the radial center of the sliding surface from a minute gap between the sliding surfaces during the relative rotation of the pair of sliding components and the liquid is easily repelled to the inner radial side or the outer radial side due to the relative rotation of the pair of sliding components, it is difficult to effectively contribute to the improvement of lubricity. Therefore, there is a problem that the pair of sliding components cannot maintain high lubricity over a long period of time.

The present invention has been made in view of such problems and an object thereof is to provide a sliding component capable of maintaining high lubricity over a long period of time by efficiently using a liquid supplied between sliding surfaces.

Solution to Problem

In order to solve the foregoing problem, a pair of sliding components according to the present invention is a pair of sliding components disposed at a relatively rotating position to face each other when a rotating machine is driven, wherein at least one sliding surface of the pair of sliding components is formed on an outer peripheral edge portion or an inner peripheral edge portion of the one sliding surface and includes an opening portion extending in a circumferential direction and a fluid supply groove communicating with the opening portion and opening to a peripheral edge of the one sliding surface on a side of the opening portion. According to the aforesaid features of the present invention, the opening portion extends in the circumferential direction and opens in the radial direction so that a liquid is easily taken thereinto and the liquid taken into the opening portion is introduced into the fluid supply groove and is moved to the radial center of the sliding surface. Accordingly, the liquid is supplied between the sliding surfaces and high lubricity between the sliding surfaces can be maintained over a long period of time.

It may be preferable that depths of the opening portion and the fluid supply groove are equal to each other. According to this preferable configuration, the liquid is easily guided from the opening portion to the fluid supply groove.

It may be preferable that an annular opening concave portion is cooperatively formed by the pair of sliding components on a radially outer side or a radially inner side of the sliding surface, and wherein the opening portion communicates with the annular opening concave portion. According to this preferable configuration, the annular opening concave portion can reliably collect the liquid. Therefore, the liquid is easily taken into the opening portion by the annular opening concave portion.

It may be preferable that the fluid supply groove extends from a circumferential end portion of the opening portion. According to this preferable configuration, the fluid supply groove can efficiently introduce the liquid having moved to the circumferential end portion in the opening portion.

It may be preferable that a plurality of the fluid supply grooves and a plurality of the opening portions are arranged in the circumferential direction. According to this preferable configuration, the liquid can be uniformly supplied in the circumferential direction.

It may be preferable that the fluid supply grooves and the opening portions constitute a fluid circulation path which is continuous in an annular shape in a circumferential direction. According to this preferable configuration, since the liquid flowing through the fluid supply groove is easily taken into the downstream opening portion, the fluid circulation path can efficiently contribute to lubrication by circulating the liquid.

It may be preferable that a plurality of the fluid circulation paths may be formed with a phase shift. According to this preferable configuration, overall lubricity between the sliding surfaces can be improved. Further, the fluid can be efficiently stored on the side opposite to the opening portion from the intersection portion between the fluid supply groove of one fluid circulation path and the fluid supply groove of the other fluid circulation path.

DESCRIPTION OF EMBODIMENTS

Figure 1:
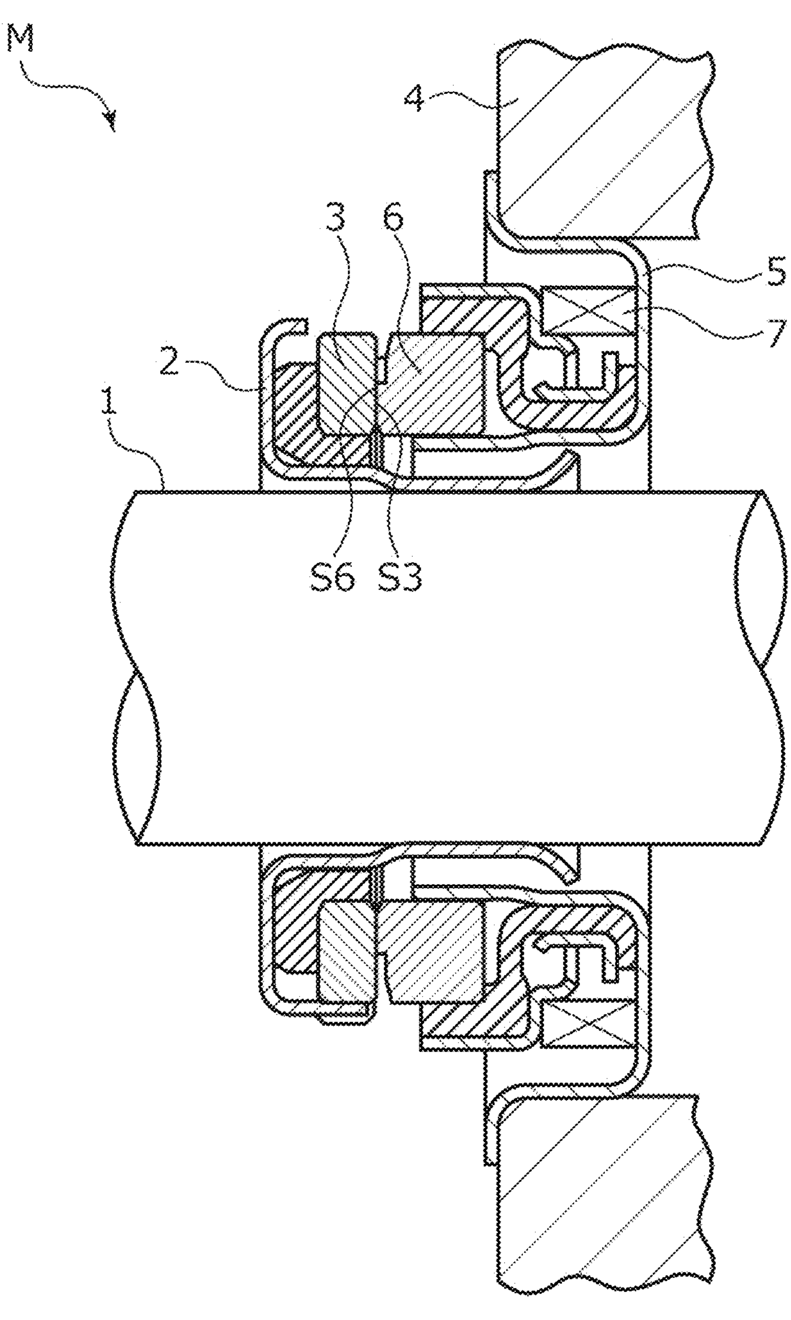
FIG. 1 is a cross-sectional view illustrating a structure of a rotating machine in which a mechanical seal including a pair of sliding components according to a first embodiment of the present invention is used.

Modes for carrying out a pair of sliding components according to the present invention will be described on the basis of the embodiments.

First Embodiment

A pair of sliding components according to a first embodiment of the present invention will be described with reference to FIGS. 1 to 4. For convenience of description, in the drawings, grooves and the like formed in a sliding surface are indicated by dots.

Sliding components of this embodiment correspond to a rotating seal ring 3 and a stationary seal ring 6 constituting a mechanical seal M as a shaft sealing device that seals a rotating shaft of a rotating machine, for example, in automobiles, general industrial machines, or other seal fields.

Referring to FIG. 1, the rotating seal ring 3 is formed in an annular shape. Further, the rotating seal ring 3 is attached to a rotating shaft 1 through a sleeve 2 and is rotatable together with the rotating shaft 1.

The stationary seal ring 6 is formed in an annular shape. Further, the stationary seal ring 6 is attached to a seal cover 5 fixed to a housing 4 of the rotating machine in a non-rotatable state and an axially movable state.

A sliding surface S6 of the stationary seal ring 6 is disposed to face a sliding surface S3 of the rotating seal ring 3. Further, the stationary seal ring 6 is biased toward the rotating seal ring 3 by a biasing force of biasing means 7.

As a result, the rotating seal ring 3 and the stationary seal ring 6 closely slide on each other between the sliding surfaces S3 and S6.

Further, the mechanical seal M is of a so-called outside mechanical seal and prevents a sealed fluid on an inner peripheral side as a sealed fluid side from flowing out to an outer peripheral side as a leakage side by sliding surfaces S3 and S6 of the rotating seal ring 3 and the stationary seal ring 6.

Further, in this embodiment, the sealed fluid is a gaseous high-pressure fluid such as dry gas and the fluid on the outer peripheral side is a gaseous low-pressure fluid such as air and dry gas.

Further, lubricant Lu as a liquid such as lubricating oil is stored on the outer peripheral sides of the rotating seal ring 3 and the stationary seal ring 6. A small amount of the lubricant Lu is supplied to the outer peripheral edges of the sliding surfaces S3 and S6 of the rotating seal ring 3 and the stationary seal ring 6 by dropping the lubricant after rolling up the lubricant as the rotating shaft 1 rotates. Additionally, the dropping method of the lubricant Lu may be changed as appropriate.

The rotating seal ring 3 and the stationary seal ring 6 are typically formed of SiC (as an example of hard material) or a combination of SiC and carbon (as an example of soft material). However, any sliding material can be applied insofar as it is used as a sliding material for a mechanical seal. The SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC-TiC, and SiC-TiN. As the carbon, resin-molded carbon, sintered carbon, and the like can be used, including carbon in which carbon and graphite are mixed. In addition to the above sliding materials, a metal material, a resin material, a surface modification material (e.g., coating material), a composite material, and the like can also be applied.

Figure 2:
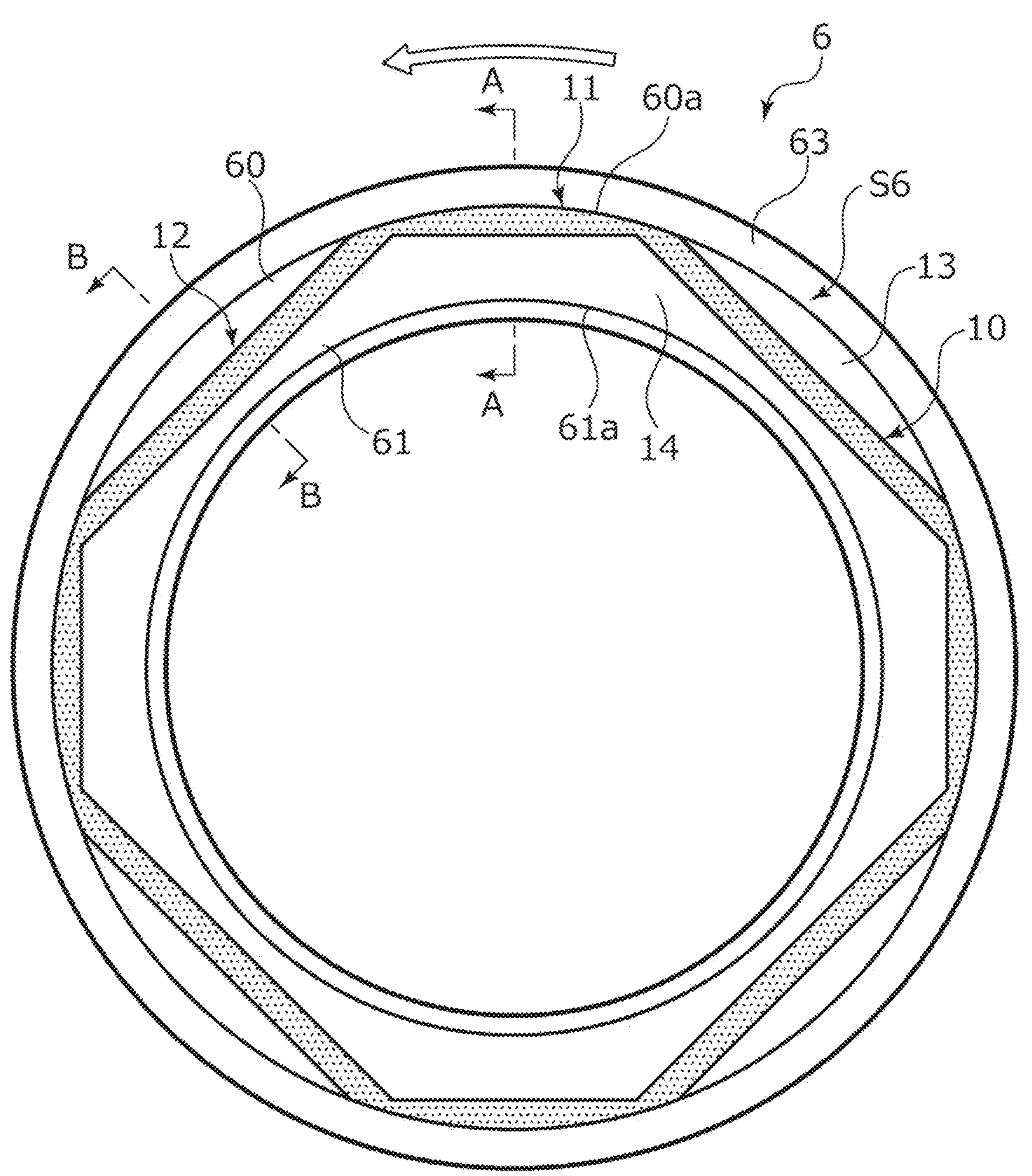
FIG. 2 is a view in which a stationary seal ring of the mechanical seal is viewed from a sliding surface side.

As illustrated in FIGS. 2 and 4, an outer radial side tapered surface 63, an outer peripheral surface 62 (see FIG. 4), the sliding surface S6, and an inner radial side tapered surface are formed at the axial end portion in the direction of the sliding surface S3 of the rotating seal ring 3 in the stationary seal ring 6 in order from the outer radial side to the inner radial side.

First, the sliding surface S6 of the stationary seal ring 6 will be described in detail. As illustrated in FIG. 2, an annular fluid circulation path 10 is formed in the sliding surface S6. Additionally, the fluid circulation path 10 can be formed by subjecting the sliding surface S6 to fine processing of laser processing, etching, sandblasting, or the like.

The fluid circulation path 10 includes opening portions 11 arranged at four equal intervals and fluid supply grooves 12 arranged at four equal intervals.

The opening portion 11 is formed in an outer peripheral edge portion 60 of the sliding surface S6.

Figure 3:
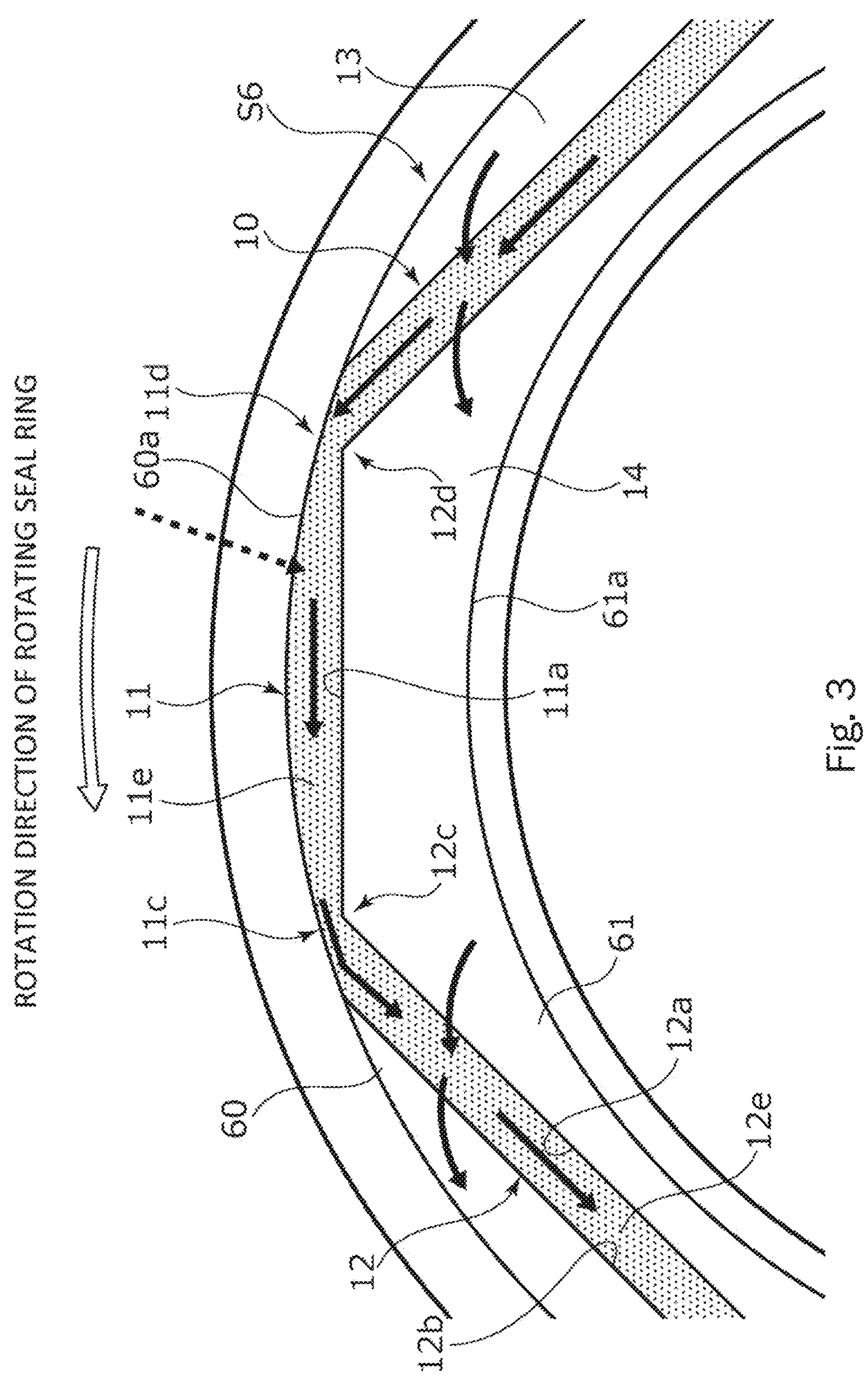
FIG. 3 is an enlarged view illustrating a part of a sliding surface of the stationary seal ring.
Figure 4A:
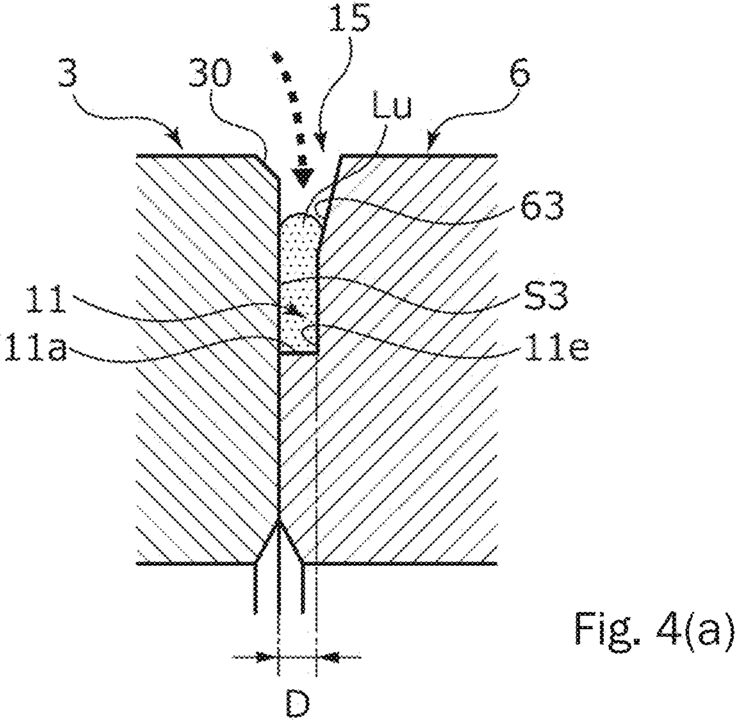
FIG. 4A is a cross-sectional view taken along a line A-A of FIG. 2 and illustrating a sliding state between the stationary seal ring and the rotating seal ring and FIG. 4B is a cross-sectional view taken along a line B-B of FIG. 2 and illustrating a sliding state between the stationary seal ring and the rotating seal ring.
Figure 4B:
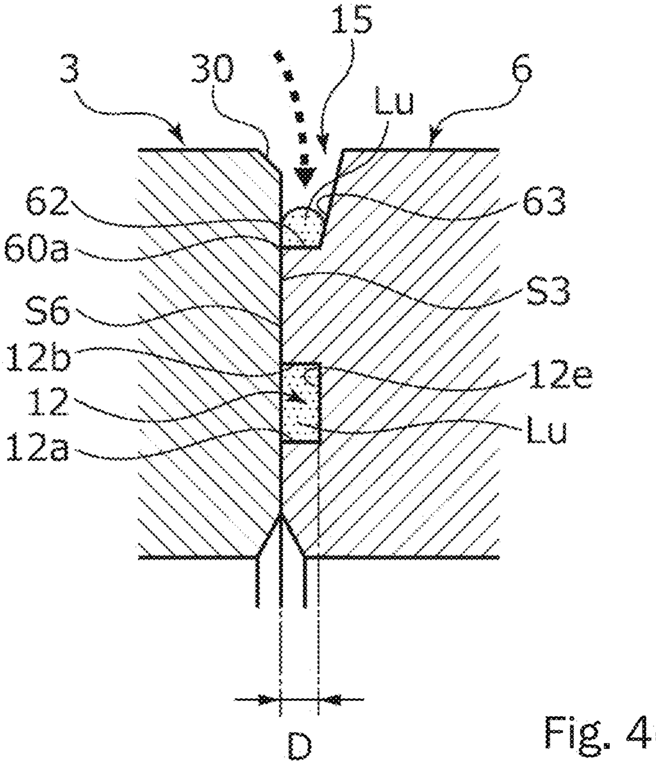

More specifically, as illustrated in FIG. 3, the opening portion 11 is defined by a wall 11*a* on the inner radial side of an outer peripheral edge 60*a* and a bottom surface 11*e*. The wall 11*a* extends upward from the bottom surface 11*e* and is orthogonal to a land 14. The bottom surface 11*e* extends in parallel to the lands 13 and 14. The opening portion 11 has a stepped cross-section (see FIG. 4A) and opens in the direction of the sliding surface S3 of the facing rotating seal ring 3 and in the outer peripheral direction.

As illustrated in FIG. 2, a fluid supply groove 12 extends in a linear shape and communicates with the adjacent opening portions 11 and 11.

More specifically, as illustrated in FIG. 3, the fluid supply groove 12 is defined by an inner radial side wall 12*a*, a bottom surface 12*e*, and an outer radial side wall 12*b*. The walls 12*a* and 12*b* extend upward from the bottom surface 12*e* and are orthogonal to the lands 13 and 14. The bottom surface 12*e* extends in parallel to the lands 13 and 14. The fluid supply groove 12 has a concave cross-section (see FIG. 4B), opens in the direction of the sliding surface S3 of the facing rotating seal ring 3, and communicates with the adjacent opening portions 11 and 11 (see FIG. 2).

Further, the inner radial side wall 12*a* of the fluid supply groove 12 is continuous to the inner radial side wall 11*a* of the opening portion 11 while forming an obtuse angle.

Further, the bottom surface 12*e* of the fluid supply groove 12 and the bottom surface 11*e* of the opening portion 11 form substantially the same plane. That is, as illustrated in FIG. 4, the opening portion 11 and the fluid supply groove 12 have substantially the same depth D.

Returning to FIG. 2, the outer radial side wall 12*b* of the fluid supply groove 12 and the outer peripheral edge 60*a* form an acute angle.

Further, the sliding surface S6 includes the lands 13 and 14 and these upper end surfaces are located on the same plane. The land 13 is defined by the outer peripheral edge 60*a* and the fluid supply groove 12 and four lands are provided in this embodiment. The land 14 is defined by the fluid circulation path 10 and the inner peripheral edge 61*a* and is annularly connected without interruption.

Further, as illustrated in FIG. 4, an annular opening concave portion 15 is formed on the outer radial side of the sliding surface S6 by the rotating seal ring 3 and the stationary seal ring 6 when the mechanical seal M is assembled and used. The annular opening concave portion 15 has a rectangular cross section that is continuous in the circumferential direction and opens in the outer circumferential direction.

The annular opening concave portion 15 will be described in detail. The annular opening concave portion 15 is defined by a tapered surface 30 of the rotating seal ring 3, the sliding surface S3 of the rotating seal ring 3, the outer peripheral surface 62 of the stationary seal ring 6, and the outer radial side tapered surface 63 of the stationary seal ring 6.

The tapered surface 30 of the rotating seal ring 3 obliquely extends in a direction moving away from the stationary seal ring 6 and extends in the circumferential direction as it goes from the outer peripheral edge of the sliding surface S3 toward the outer radial side.

The outer peripheral surface 62 of the stationary seal ring 6 is orthogonal to the outer peripheral edge 60*a* of the sliding surface S6, extends in a direction moving away from the rotating seal ring 3, and extends in the circumferential direction. The outer radial side tapered surface 63 of the stationary seal ring 6 obliquely extends in a direction moving away from the rotating seal ring 3 and extends in the circumferential direction as it goes from the outer peripheral surface 62 toward the outer radial side. The outer peripheral edge of the sliding surface S3 is located on the outer radial side of the outer peripheral edge 60*a* of the sliding surface S6.

Next, the flow of the lubricant Lu supplied when the rotating machine is driven will be described. Additionally, a white arrow in FIG. 2 indicates the relative rotation direction of the rotating seal ring 3 which is a mating sliding component. That is, it is assumed that the rotating seal ring 3 rotates counterclockwise.

Referring to FIG. 4, the lubricant Lu dropped to the annular opening concave portion 15 is guided toward the bottom portion side of the annular opening concave portion 15, that is, the outer peripheral surface 62 and the outer peripheral edge 60*a* of the stationary seal ring 6 by the tapered surface 30 of the rotating seal ring 3, the sliding surface S3, and the outer radial side tapered surface 63 of the stationary seal ring 6.

In this way, since the annular opening concave portion 15 is formed by the rotating seal ring 3 and the stationary seal ring 6, the dropped lubricant Lu can be reliably collected.

Further, even if the lubricant Lu is a small liquid mass, the lubricant merges with other lubricant Lu while moving in the circumferential direction inside the annular opening concave portion 15 to become a large liquid mass.

As indicated by a dotted arrow in FIGS. 3 and 4, the lubricant Lu collected in the annular opening concave portion 15 is taken into the opening portion 11 of the sliding surface S6 during the relative rotation of the rotating seal ring 3 and the stationary seal ring 6.

As illustrated in FIG. 3, when the lubricant Lu is taken into the opening portion 11, the lubricant Lu moves along the inner radial side wall 11*a* toward a circumferential downstream end portion 11*c* which is located on the downstream side in the rotation direction as indicated by a solid arrow.

An upstream end portion 12*c* of the fluid supply groove 12 communicates with the circumferential downstream end portion 11*c* on the downstream side in the rotation direction and the outer radial side wall 12*b* of the fluid supply groove 12 faces the circumferential downstream end portion. The outer radial side wall 12*b* has a component extending in the rotation direction of the rotating seal ring 3 and a component extending in the radial direction and is formed to be inclined in the radial direction.

Accordingly, as indicated by a solid arrow in FIG. 3, the fluid supply groove 12 can efficiently introduce the lubricant Lu having moved to the circumferential downstream end portion 11*c* of the opening portion 11.

Further, since the opening portion 11 and the fluid supply groove 12 have substantially the same depth D, the lubricant Lu can be easily guided from the opening portion 11 to the fluid supply groove 12.

Additionally, the depth D of the opening portion 11 and the fluid supply groove 12 is sufficiently deep. Even when the lubricant Lu or the sealed fluid follows the rotation of the rotating seal ring 3, a little or no dynamic pressure that biases the sliding surfaces S3 and S6 away from each other is generated.

Further, in the fluid supply groove 12, a downstream end portion 12*d* in the movement direction of the lubricant Lu communicates with a circumferential upstream end portion 11*d* in the downstream opening portion 11.

Accordingly, the fluid supply groove 12 moves the introduced lubricant Lu along the walls 12*a* and 12*b* so that the lubricant can be preferably introduced into the downstream opening portion 11.

In this way, the lubricant Lu flowing into the fluid supply groove 12 moves along with the relative rotation of the rotating seal ring 3 and the stationary seal ring 6 and is partially supplied between the sliding surfaces S3 and S6. Specifically, the lubricant is supplied between the facing positions of the land 13 and the sliding surface S3 of the rotating seal ring 3 and between the facing positions of the annular land 14 and the sliding surface S3 of the rotating seal ring 3.

Particularly, since the longitudinal center of the fluid supply groove 12 is located at the radial center of the sliding surface S6, the lubricant Lu can be supplied to the radial center of the sliding surface S6. Here, in this specification, the center means a position between members and does not mean a half position.

As the rotating seal ring 3 rotates, most of the lubricant Lu supplied between the sliding surfaces S3 and S6 is collected in the opening portion 11 and the fluid supply groove 12 located on the downstream side in the rotation direction.

On the other hand, the lubricant Lu taken from the fluid supply groove 12 into the downstream opening portion 11 moves inside the downstream opening portion 11 along the circumferential direction and is introduced into the downstream fluid supply groove 12 as described above.

In this way, the lubricant Lu flows in order of the opening portion 11, the fluid supply groove 12, the opening portion 11, the fluid supply groove 12, and the like. Accordingly, the fluid circulation path 10 can allow the lubricant Lu to efficiently contribute to the lubrication.

Here, contamination such as wear due to sliding between the sliding surfaces S3 and S6 may occur. The fluid supply groove 12 communicates with the outer radial side of the sliding surfaces S3 and S6 through the downstream opening portion 11. Therefore, particularly, contamination having a specific weight larger than that of the lubricant Lu is easily discharged to the outer radial side of the sliding surfaces S3 and S6 during the relative rotation of the rotating seal ring 3 and the stationary seal ring 6. On the other hand, the lubricant Lu flows more easily along the downstream opening portion 11 than contamination.

Further, since the fluid circulation path 10 of this embodiment has an axis-symmetric shape, the lubricant Lu can be supplied even if the rotation direction of the mating sliding component is a clockwise rotation direction which is a direction opposite to that of this description.

Additionally, the upstream and the downstream are referred to for the convenience of description based on the rotation direction of the rotating seal ring 3. It is needless to say that the position changes depending on the rotation direction of the mating sliding component.

As described above, in the mechanical seal M of this embodiment, the lubricant Lu is supplied between the sliding surfaces S3 and S6 and high lubricity between the sliding surfaces S3 and S6 can be maintained over a long period of time. This is because the lubricant Lu supplied to the outer peripheral edge 60*a* of the sliding surface S6 is easily taken into the opening portion 11 extending in the circumferential direction and opening in the radial direction and the lubricant Lu taken into the opening portion 11 is introduced into the fluid supply groove 12 and is moved to the radial center of the sliding surface S6.

Further, since the annular opening concave portion 15 can reliably collect the dropped lubricant Lu, the lubricant Lu is easily taken from the annular opening concave portion 15 into the opening portion 11.

Further, since the opening portion 11 and the fluid supply groove 12 are arranged at four equal intervals on the sliding surface S6, the lubricant Lu can be supplied uniformly in the circumferential direction of the sliding surfaces S3 and S6.

Figure 5:
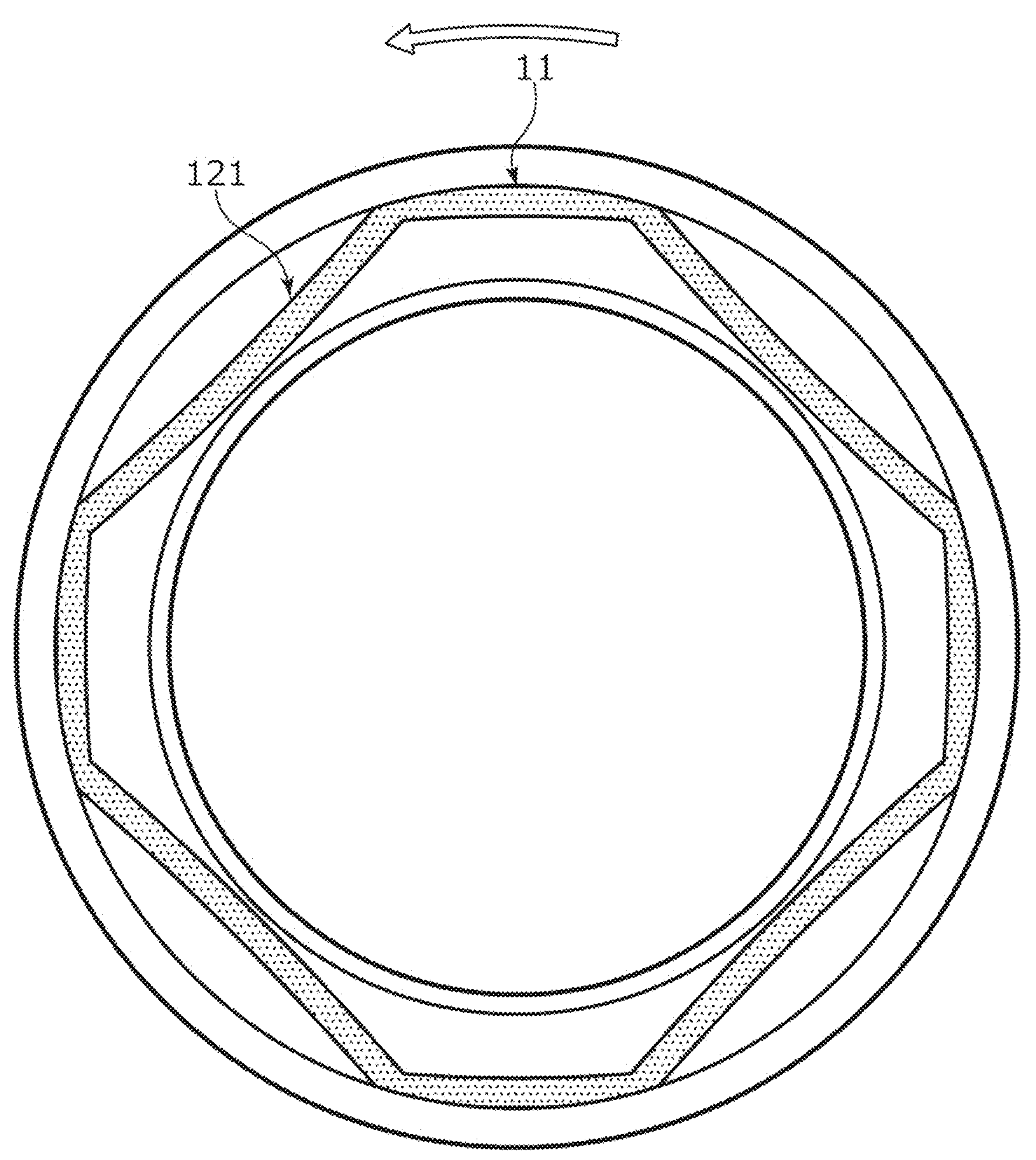
FIG. 5 is a view in which a stationary seal ring of a first modified example is viewed from a sliding surface side.
Figure 6:
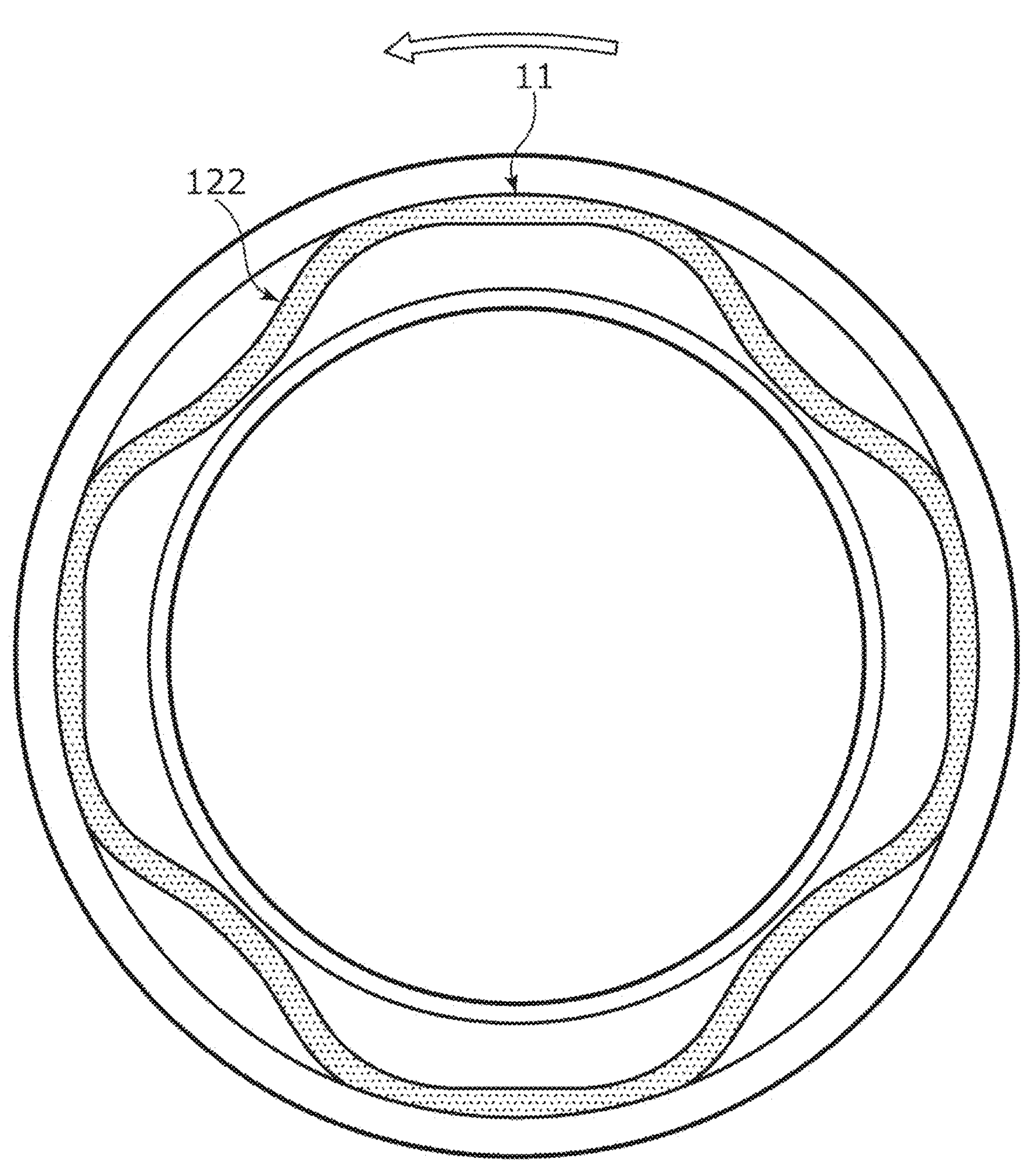
FIG. 6 is a view in which a stationary seal ring of a second modified example is viewed from a sliding surface side.

Additionally, in this embodiment, it has been described that the fluid supply groove 12 extends in a linear shape, but the present invention is not limited thereto. For example, the fluid supply groove may be curved as in a fluid supply groove 121 illustrated in FIG. 5 as a first modified example and may meander as in a fluid supply groove 122 illustrated in FIG. 6 as a second modified example. That is, the shape of the fluid supply groove may be appropriately changed. Similarly, the shape of the opening portion may be appropriately changed.

Figure 7:
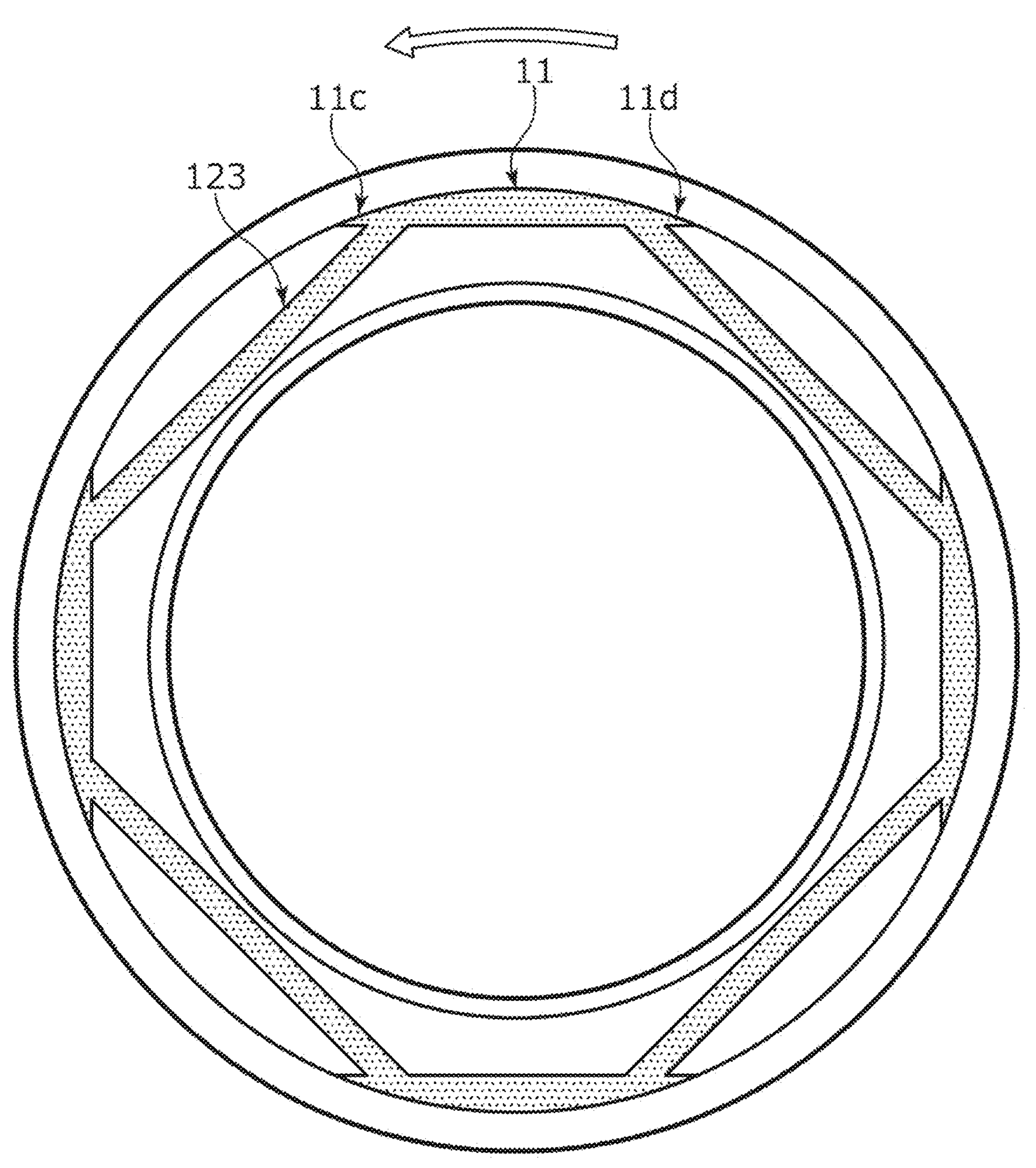
FIG. 7 is a view in which a stationary seal ring of a third modified example is viewed from a sliding surface side.

Further, in this embodiment, it has been described that the fluid supply groove 12 communicates with the circumferential end portions 11*c* and 11*d* of the opening portion 11, but the present invention is not limited thereto. For example, the fluid supply groove may communicate with the longitudinal center of the opening portion 11 in relation to the circumferential end portions 11*c* and 11*d* of the opening portion 11 as in a fluid supply groove 123 illustrated in FIG. 7 as a third modified example.

Figure 8:
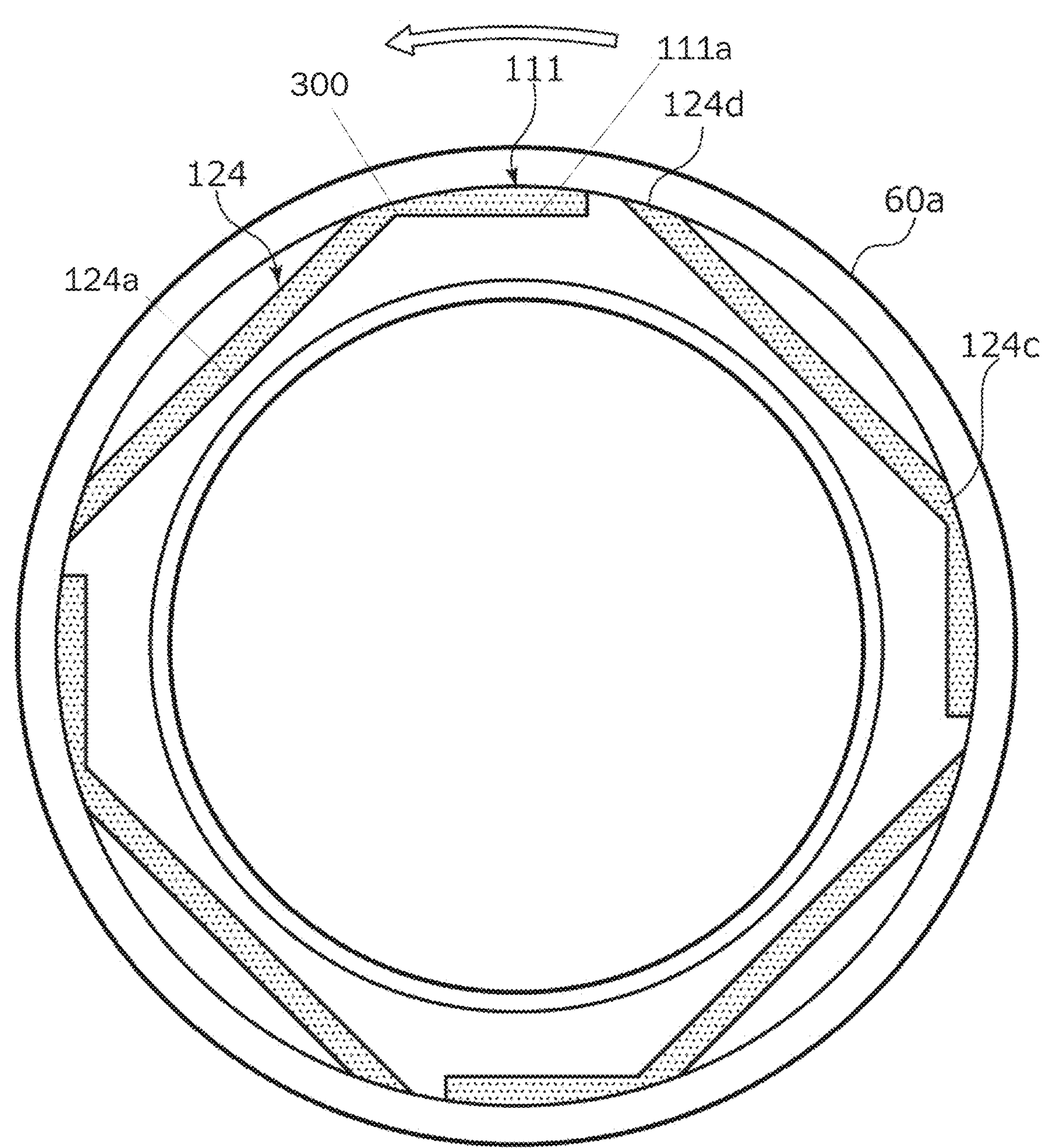
FIG. 8 is a view in which a stationary seal ring of a fourth modified example is viewed from a sliding surface side.

Further, in this embodiment, it has been described that the fluid supply groove 12 communicates with the adjacent opening portions 11 and 11 to form the annular fluid circulation path 10, but the present invention is not limited thereto. For example, as in an opening portion 111 and a fluid supply groove 124 illustrated in FIG. 8 as a fourth modified example, an upstream end portion 124*c* of the fluid supply groove 124 may communicate with only the upstream opening portion 111 in the rotation direction and a downstream end portion 124*d* of the fluid supply groove 124 may open to the outer peripheral edge 60*a*. That is, the fluid circulation path may not be formed. The opening portion 111 is partially defined by a wall 111a facing toward the outer diameter side. The fluid supply groove 124 is partially defined by a wall 124*a*. The wall 111*a* and the wall 124*a* directly intersect with each other, thereby forming a protruded wall portion 300 which is protruded toward the outer diameter side.

Further, in this embodiment, it has been described that the annular opening concave portion 15 has a rectangular cross-section continuous in the circumferential direction, but the present invention is not limited thereto. For example, the cross-sectional shape of the annular opening concave portion may be changed as appropriate, and the cross-sectional shape of the annular opening concave portion may be discontinuous in the circumferential direction.

Figure 9:
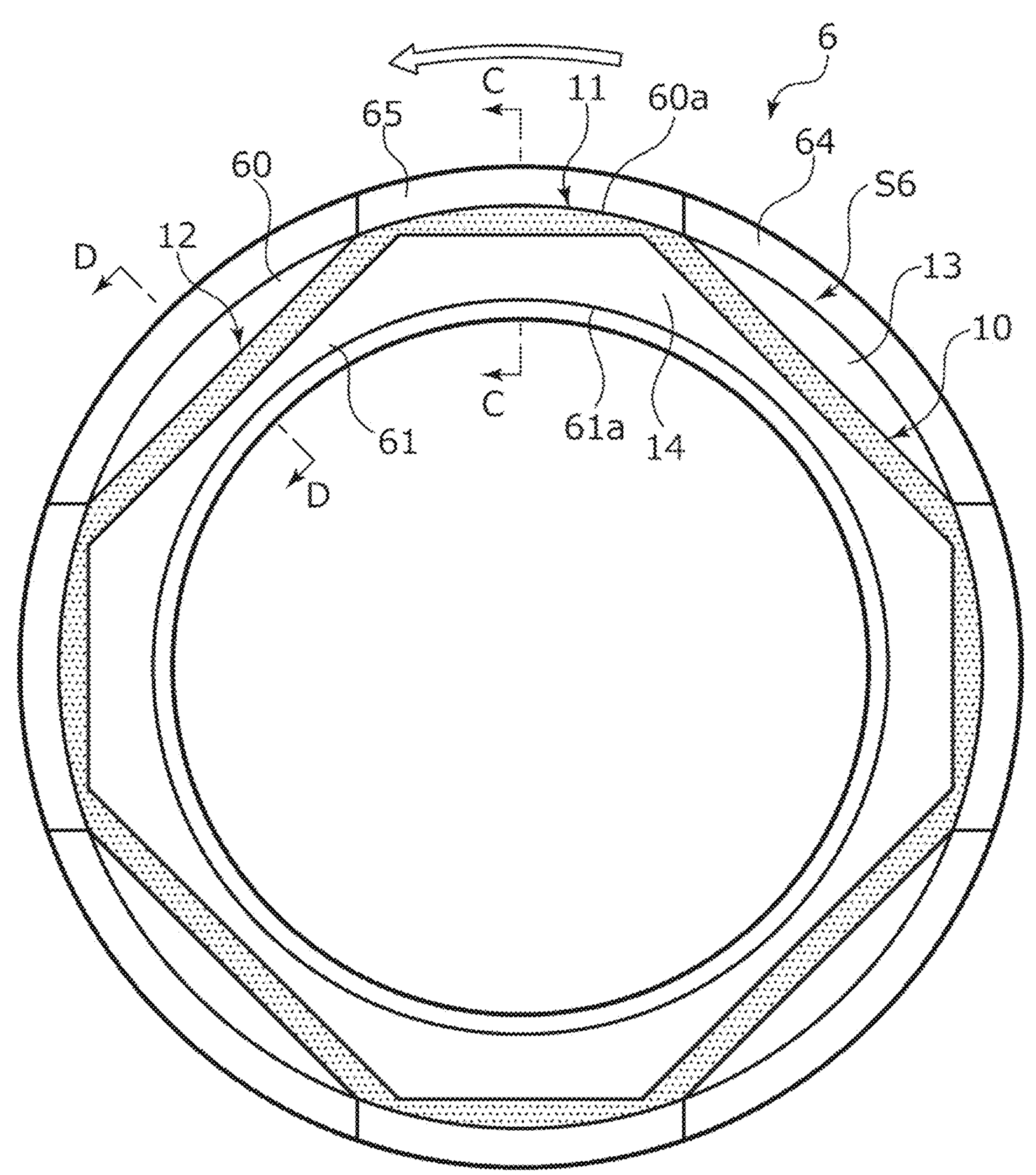
FIG. 9 is a view in which a stationary seal ring of a fifth modified example is viewed from a sliding surface side.
Figure 10A:
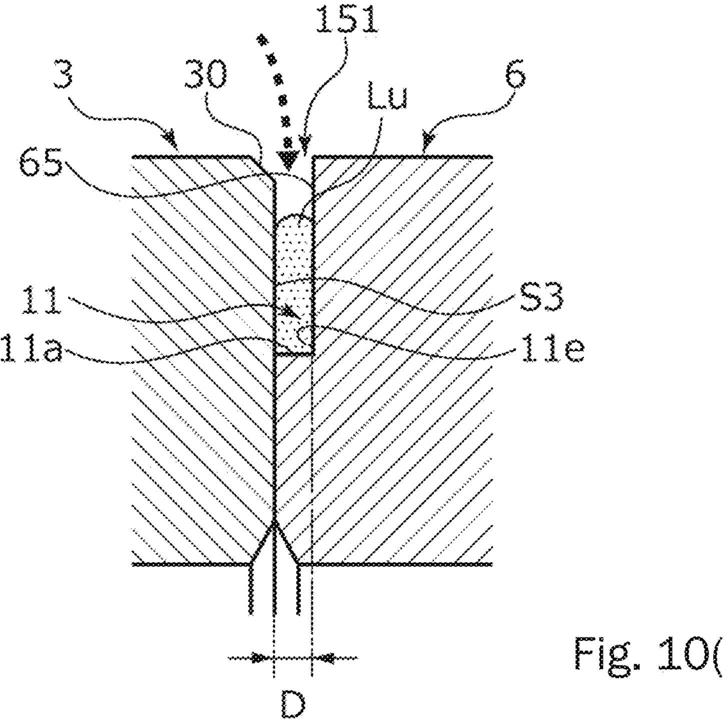
FIG. 10A is a cross-sectional view taken along a line C-C of FIG. 9 and illustrating a sliding state between a stationary seal ring and a rotating seal ring of a fifth modified example and FIG. 10B is a cross-sectional view taken along a line D-D of FIG. 9 and illustrating a sliding state between the stationary seal ring and the rotating seal ring of the fifth modified example.
Figure 10B:
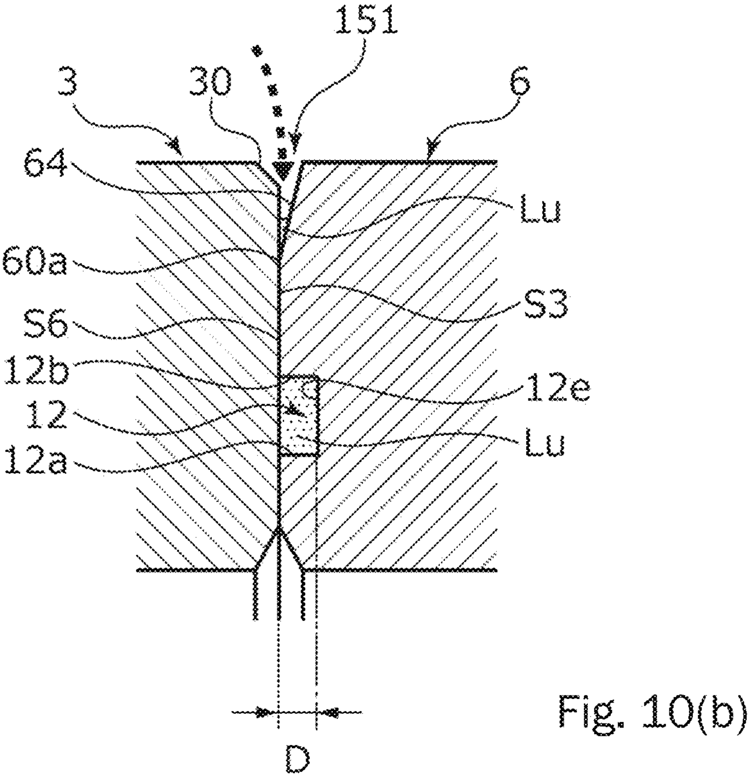

For example, the fifth modified example will be described with reference to FIGS. 9 and 10. An annular opening concave portion 151 may overlap the opening portion 11 in the radial direction while communicating with the opening portion 11 as illustrated in FIG. 10A and may not overlap the opening portion 11 in the radial direction while not communicating with the opening portion 11 as illustrated in FIG. 10B.

First, a portion which does not overlap the opening portion 11 in the radial direction will be described. Referring to FIG. 10B, the annular opening concave portion 151 is defined by the tapered surface 30 of the rotating seal ring 3, the sliding surface S3 of the rotating seal ring 3, and the outer radial side tapered surface 64 of the stationary seal ring 6 and has a triangular cross-section. Additionally, for convenience of description, a flat surface of the rotating seal ring 3 facing the stationary seal ring 6 is called the sliding surface S3 and precisely does not have a portion that comes into sliding contact with the stationary seal ring 6.

The outer radial side tapered surface 64 of the stationary seal ring 6 obliquely extends in a direction moving away from the rotating seal ring 3 as it goes from the outer peripheral edge 60*a* of the sliding surface S6 toward the outer radial side. Accordingly, the lubricant Lu dropped to the annular opening concave portion 151 is guided toward the bottom portion side of the annular opening concave portion 151, that is, the outer peripheral edge 60*a* of the stationary seal ring 6 by the outer radial side tapered surface 64.

Further, since the annular opening concave portion 151 is shortened in the axial direction by the outer radial side tapered surface 64 toward the inner radial side, the lubricant Lu inside the annular opening concave portion 151 is difficult to be discharged to the space on the outer radial side. This becomes more remarkable as the surface tension of the lubricant Lu increases.

Next, a portion overlapping the opening portion 11 of the annular opening concave portion 151 in the radial direction will be described. Referring to FIG. 10A, a recess 65 which is recessed in the axial direction is formed at four positions of the outer radial side tapered surface 64 of the stationary seal ring 6 and the recess 65 serves as a communication path that communicates with the opening portion 11. The recess 65 has a rectangular cross-section while the bottom surface is continuous to the bottom surface 11*e* of the opening portion 11 in substantially the same plane. Accordingly, the opening portion 11 can easily take the lubricant Lu through the recess 65.

Second Embodiment

Next, a pair of sliding components according to a second embodiment of the present invention will be described with reference to FIGS. 11 and 12. Additionally, the same reference numerals are assigned to the same components as those illustrated in the first embodiment, and redundant descriptions are omitted.

Figure 11:
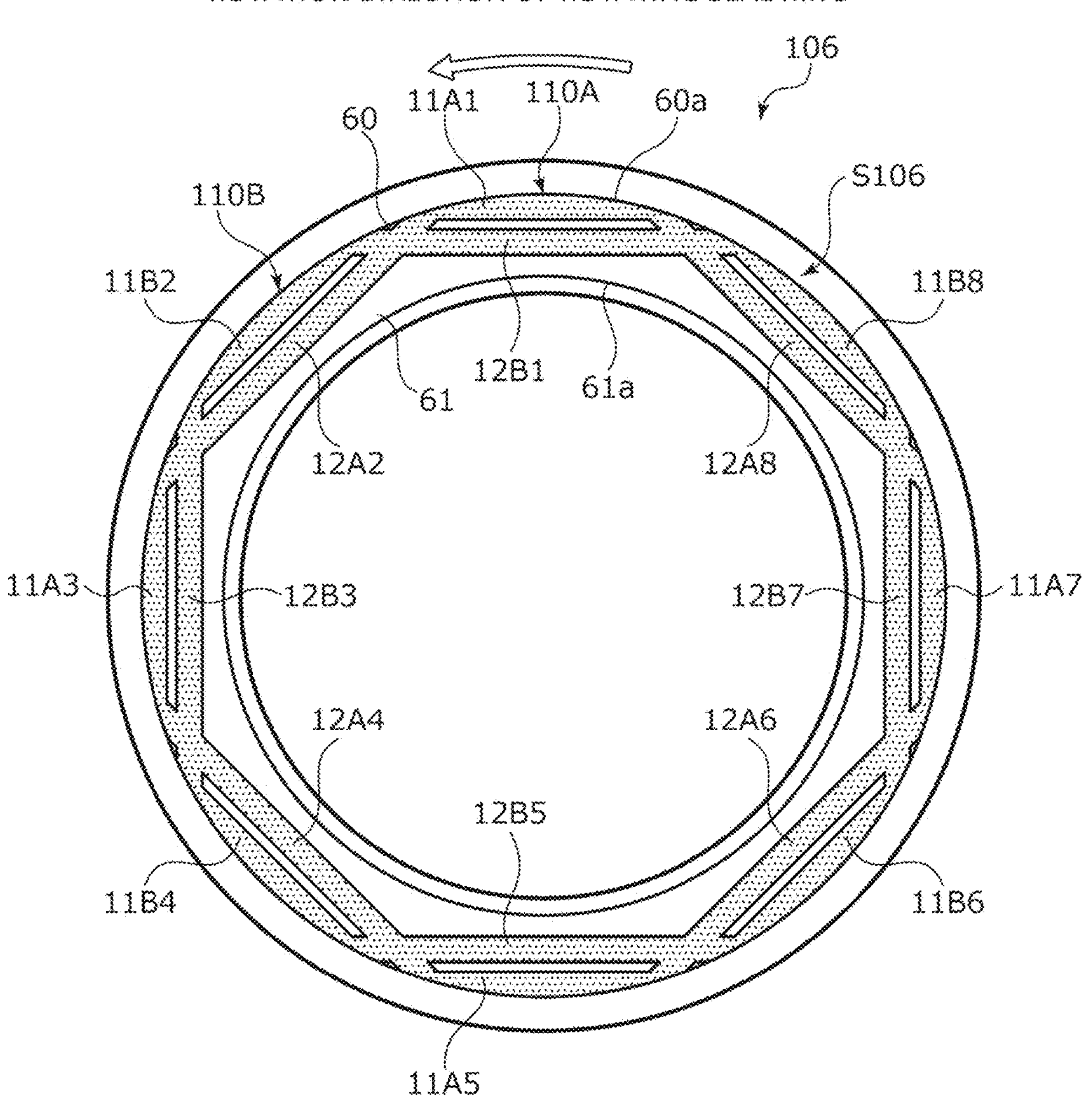
FIG. 11 is a view in which a stationary seal ring of a pair of sliding components according to a second embodiment of the present invention is viewed from a sliding surface side.

As illustrated in FIG. 11, two fluid circulation paths 110 are formed on a sliding surface S106 of a stationary seal ring 106 while being shifted by about 45° in the circumferential direction.

Figure 12:
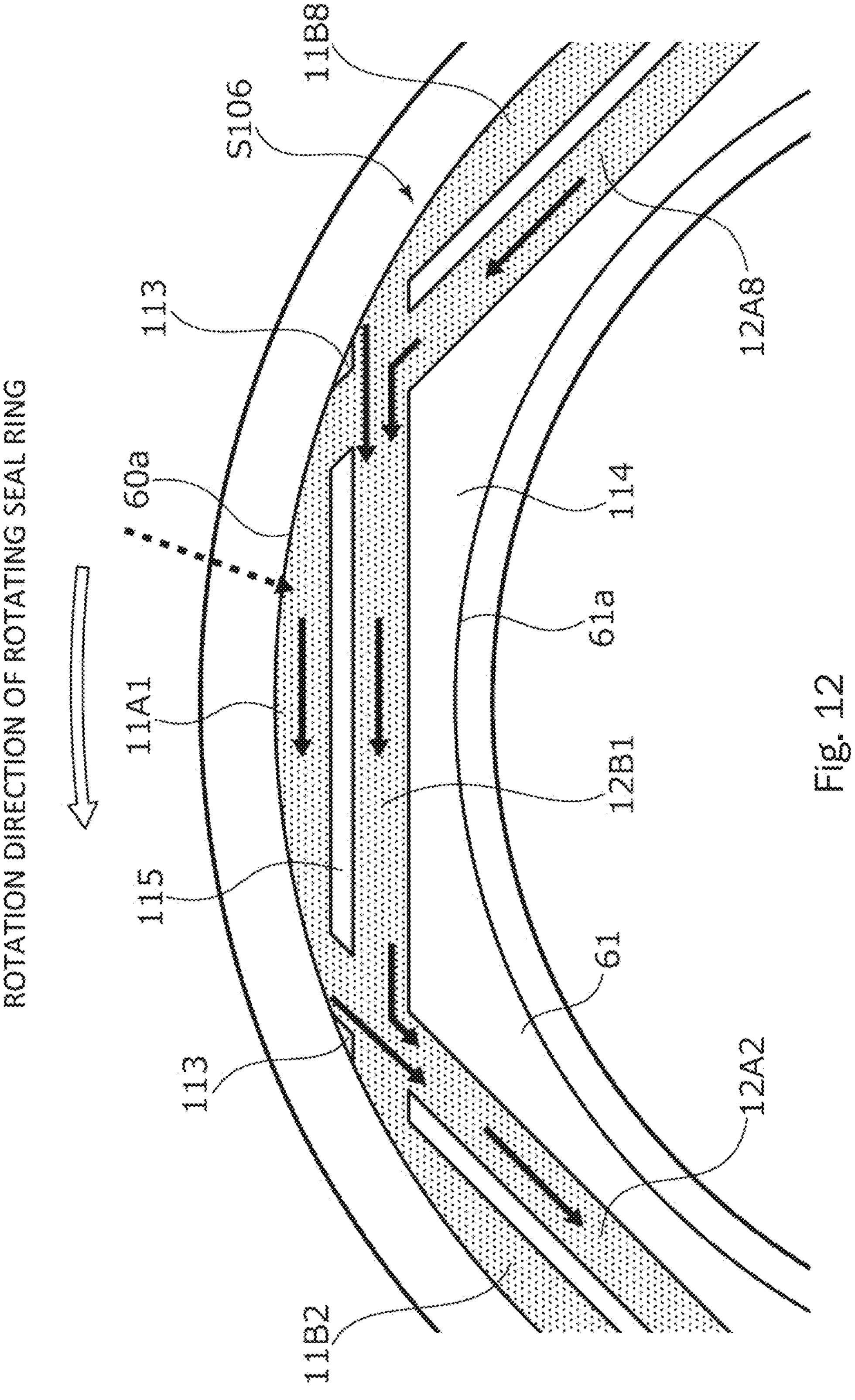
FIG. 12 is an enlarged view illustrating a part of a sliding surface of the stationary seal ring in the second embodiment.

Additionally, the configuration of the fluid circulation path 110 alone is the same as that of the fluid circulation path 10 of the first embodiment, but for convenience of description, the fluid circulation path 110 illustrated at the same angle as the first embodiment in FIGS. 11 and 12 is referred to as a fluid circulation path 110A and the fluid circulation path 110 shifted in the circumferential direction with respect to the fluid circulation path 110A is referred to as a fluid circulation path 110B.

Further, for convenience of description, if necessary, the opening portions 11 and the fluid supply grooves 12 constituting the fluid circulation path 110A are referred to as an opening portion 11A1, a fluid supply groove 12A2, an opening portion 11A3, a fluid supply groove 12A4, an opening portion 11A5, a fluid supply groove 12A6, an opening portion 11A7, and a fluid supply groove 12A8 in order of the rotation direction of the rotating seal ring 3 from the 12 o'clock position of the stationary seal ring 106 in FIG. 11.

Similarly, the opening portions 11 and the fluid supply grooves 12 constituting the fluid circulation path 110B are referred to as a fluid supply groove 12B1, an opening portion 11B2, a fluid supply groove 12B3, an opening portion 11B4, a fluid supply groove 12B5, an opening portion 11B6, a fluid supply groove 12B7, and an opening portion 11B8 in order of the rotation direction of the rotating seal ring 3 from the 12 o'clock position of the stationary seal ring 106 in FIG. 11.

As illustrated in FIG. 12, the sliding surface S106 includes lands 113, 114, and 115 and the upper end surfaces thereof are located on the same plane.

The land 113 is defined by the outer peripheral edge 60*a*, the fluid supply groove 12, and the fluid supply groove 12 intersecting the fluid supply groove 12.

The land 114 is defined by the fluid supply groove 12, the fluid supply groove 12 intersecting the fluid supply groove 12, and the inner peripheral edge 61*a*.

The land 115 is defined by the opening portion 11, two fluid supply grooves 12 communicating with the opening portion 11, and the fluid supply groove 12 intersecting the two fluid supply grooves 12.

The fluid circulation paths 110A and 110B will be described in detail. Additionally, in this description, a description will be made in order of the rotation direction of the rotating seal ring 3 from the 12 o'clock position of the stationary seal ring 106 in FIG. 11, that is, in order of the downstream direction.

The downstream side of the fluid supply groove 12B1 of the fluid circulation path 110B intersects the upstream side of the fluid supply groove 12A2 of the fluid circulation path 110A.

The downstream side of the fluid supply groove 12A2 of the fluid circulation path 110A intersects the upstream side of the fluid supply groove 12B3 of the fluid circulation path 110B. The fluid supply groove 12B3 is disposed on the downstream side to be adjacent to the fluid supply groove 12B1.

The downstream side of the fluid supply groove 12B3 of the fluid circulation path 110B intersects the upstream side of the fluid supply groove 12A4 of the fluid circulation path 110A.

The downstream side of the fluid supply groove 12A4 of the fluid circulation path 110A intersects the upstream side of the fluid supply groove 12B5 of the fluid circulation path 110B.

The downstream side of the fluid supply groove 12B5 of the fluid circulation path 110B intersects the upstream side of the fluid supply groove 12A6 of the fluid circulation path 110A.

The downstream side of the fluid supply groove 12A6 of the fluid circulation path 110A intersects the upstream side of the fluid supply groove 12B7 of the fluid circulation path 110B.

The downstream side of the fluid supply groove 12B7 of the fluid circulation path 110B intersects the upstream side of the fluid supply groove 12A8 of the fluid circulation path 110A.

The downstream side of the fluid supply groove 12A8 of the fluid circulation path 110A intersects the upstream side of the fluid supply groove 12B1 of the fluid circulation path 110B.

Next, the flow of the lubricant Lu will be described with reference to FIG. 12 by exemplifying the opening portions 11A1 and 11B2 and the fluid supply grooves 12A2 and 12B1. The lubricant Lu tends to move in the rotation direction of the rotating seal ring 3, that is, in the circumferential direction.

The lubricant Lu introduced from the opening portion 11A1 to the fluid supply groove 12A2 merges with the lubricant Lu moving through the fluid supply groove 12B1 at the intersection portion of the fluid supply grooves 12A2 and 12B1 and flows to the fluid supply groove 12A2 and the opening portion 11B2.

Due to this merging, the lubricant Lu flowing through the fluid supply groove 12B1 is easily introduced into the fluid supply groove 12A2. In this way, the lubricant Lu once guided to the inner radial side of the intersection portion is less likely to be discharged to the outside and the overall lubricity between the sliding surfaces S3 and S106 can be improved.

Further, the longitudinal centers of the fluid supply grooves 12A2 and 12B1 are located on the inner radial side in relation to the intersection portion of the fluid supply grooves 12A2 and 12B1, that is, on the side opposite to the opening portion 11.

That is, the fluid circulation paths 110A and 110B can efficiently store the lubricant Lu on the side opposite to the opening portion 11.

Further, since the longitudinal centers of the fluid supply groove 12 of the fluid circulation path 110A and the fluid supply groove 12 of the fluid circulation path 110B are continuously formed in an annular shape, the lubricant Lu can be equally supplied between the sliding surfaces S3 and S106 in the circumferential direction.

Here, each fluid supply groove 12 communicates with the outer radial side of the sliding surfaces S3 and S106 through the downstream opening portion 11. Particularly, contamination having a specific weight larger than that of the lubricant Lu is easily discharged to the outer radial side of the sliding surfaces S3 and S106 during the relative rotation of the rotating seal ring 3 and the stationary seal ring 106 without staying at the inner radial side of the intersection portion between the fluid supply groove 12 of the fluid circulation path 110A and the fluid supply groove 12 of the fluid circulation path 110B.

Third Embodiment

Next, a pair of sliding components according to a third embodiment of the present invention will be described with reference to FIGS. 13 and 14. Additionally, the same reference numerals are assigned to the same components as those illustrated in the first and second embodiments, and redundant descriptions are omitted.

Figure 14:
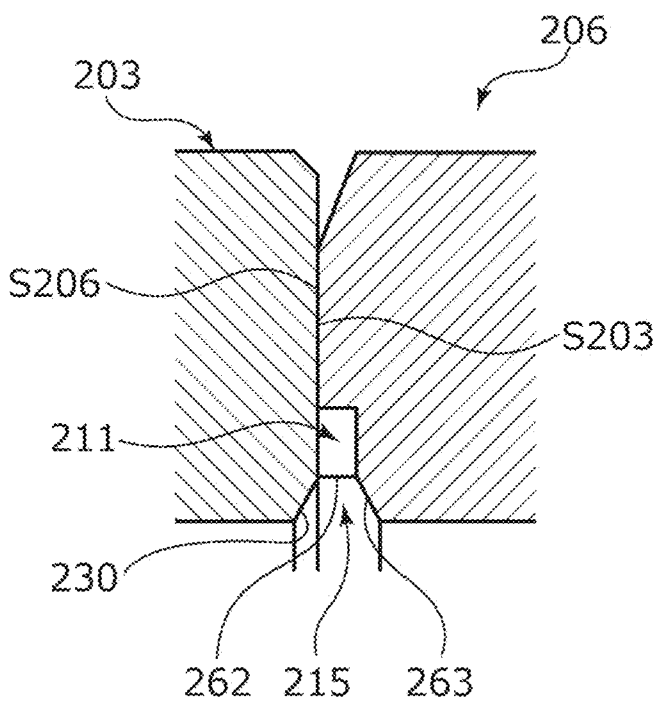
FIG. 14 is a cross-sectional view taken along a line E-E of FIG. 13 and illustrating a sliding state between a stationary seal ring and a rotating seal ring of the third embodiment.

Referring to FIG. 14, in the third embodiment, the lubricant Lu is dropped to the inner peripheral edges of sliding surfaces S203 and S206 of a rotating seal ring 203 and a stationary seal ring 206.

Figure 13:
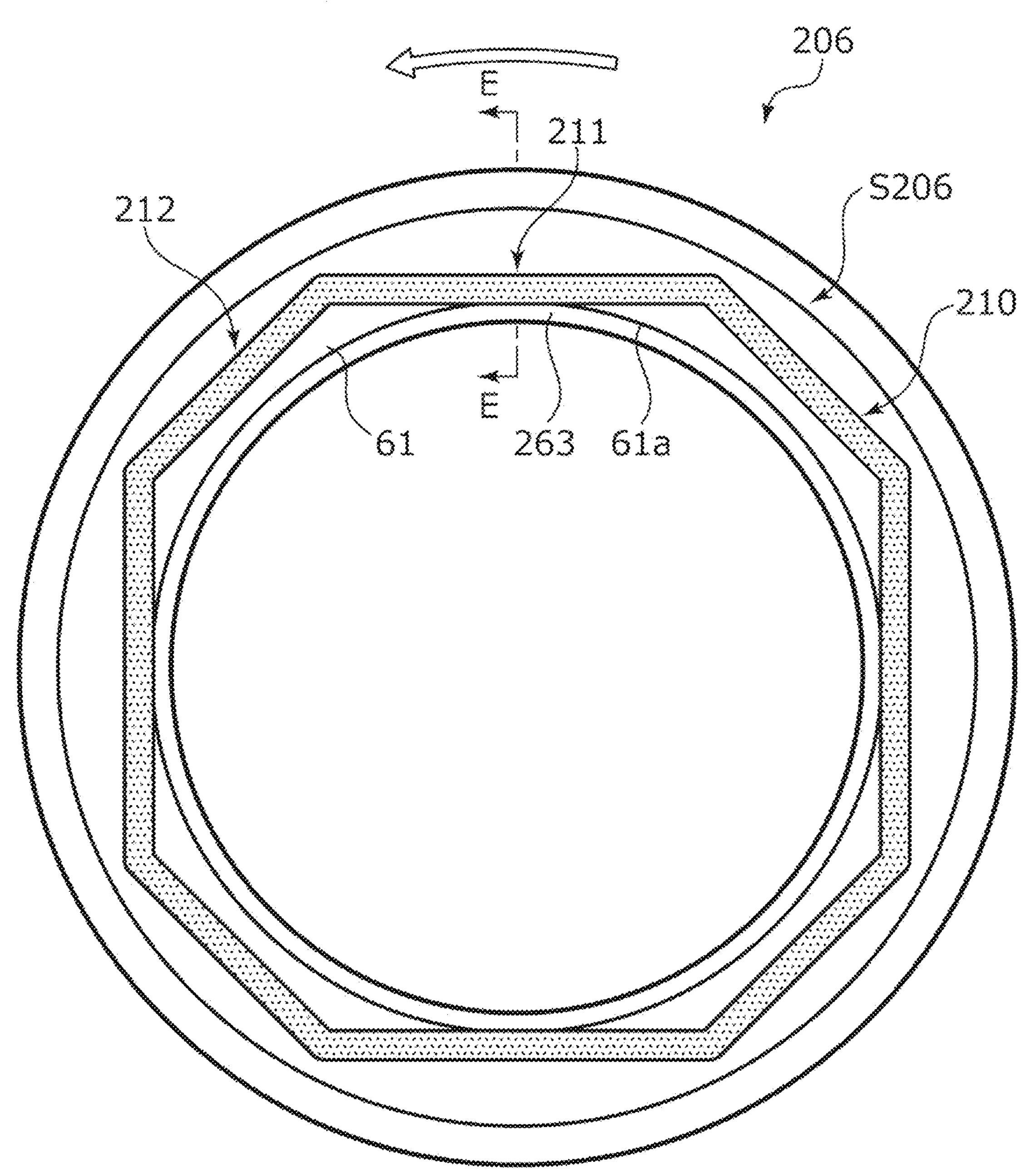
FIG. 13 is a view in which a stationary seal ring of a pair of sliding components according to a third embodiment of the present invention is viewed from a sliding surface side.

As illustrated in FIGS. 13 and 14, an outer radial side tapered surface, a sliding surface S206, an inner peripheral surface 262 (see FIG. 14), and an inner radial side tapered surface 263 are formed at the axial end portion in the direction of the sliding surface S203 of the rotating seal ring 203 in the stationary seal ring 206 in order from the outer radial side to the inner radial side.

First, the sliding surface S206 of the stationary seal ring 206 will be described in detail. A fluid circulation path 210 is formed on the sliding surface S206 of the stationary seal ring 206. The fluid circulation path 210 includes opening portions 211 arranged at four equal intervals and fluid supply grooves 212 arranged at four equal intervals.

The opening portion 211 is formed in the inner peripheral edge portion 61 of the sliding surface S206. Further, the opening portion 211 extends in a linear shape.

The fluid supply groove 212 extends in a bent C shape and communicates with the adjacent opening portions 211 and 211.

Further, as illustrated in FIG. 14, when the mechanical seal M is assembled and used, an annular opening concave portion 215 is formed on the inner peripheral side of the sliding surface S206 by the rotating seal ring 203 and the stationary seal ring 206. The annular opening concave portion 215 has a rectangular cross-section continuous in the circumferential direction and opens in the inner peripheral direction.

The annular opening concave portion 215 will be described in detail. The annular opening concave portion 215 is defined by a tapered surface 230 of the rotating seal ring 203, the sliding surface S203 of the rotating seal ring 203, the inner peripheral surface 262 of the stationary seal ring 206, and the inner radial side tapered surface 263 of the stationary seal ring 206.

The tapered surface 230 of the rotating seal ring 203 obliquely extends in a direction moving away from the stationary seal ring 206 and extends in the circumferential direction as it goes from the inner peripheral edge of the sliding surface S203 toward the inner radial side.

The inner peripheral surface 262 of the stationary seal ring 206 is orthogonal to the inner peripheral edge 61*a* of the sliding surface S206, extends in a direction moving away from the rotating seal ring 203, and extends in the circumferential direction. The inner radial side tapered surface 263 of the stationary seal ring 206 obliquely extends in a direction moving away from the rotating seal ring 203 and extends in the circumferential direction as it goes from the inner peripheral surface 262 toward the inner radial side. The inner peripheral edge of the sliding surface S203 is substantially at the same position in the radial direction as the inner peripheral edge 61*a* of the sliding surface S206.

Accordingly, the lubricant Lu dropped to the annular opening concave portion 215 is guided toward the bottom portion side of the annular opening concave portion 215, that is, the inner peripheral surface 262 and the inner peripheral edge 61*a* of the stationary seal ring 206 by the tapered surface 230 and the sliding surface S203 of the rotating seal ring 203 and the inner radial side tapered surface 263 of the stationary seal ring 206.

In this way, since the annular opening concave portion 215 is formed by the rotating seal ring 203 and the stationary seal ring 206, the dropped lubricant Lu can be reliably collected.

Further, in the mechanical seal M of this embodiment, the lubricant Lu is supplied between the sliding surfaces S203 and S206 and high lubricity between the sliding surfaces S203 and S206 can be maintained over a long period of time. This is because the lubricant Lu supplied to the inner peripheral edge 61*a* of the sliding surface S206 is easily taken into the opening portion 211 extending in the circumferential direction and opening in the radial direction and the lubricant Lu taken into the opening portion 211 is introduced into the fluid supply groove 212 and is moved to the radial center of the sliding surface S206.

Although the embodiments of the present invention have been described above with reference to the drawings, the specific configuration is not limited to these embodiments and any changes or additions that do not depart from the scope of the present invention are included in the present invention.

For example, in each of the above-described embodiments, it has been described that the mechanical seal is of an outside mechanical seal, but the present invention is not limited thereto. For example, the mechanical seal may be of a so-called inside type that prevents the sealed fluid on the outer peripheral side as the sealed fluid side from flowing out to the inner peripheral side as the leakage side.

Further, in each of the above-described embodiments, it has been described that the opening portion and the fluid supply groove are formed in the stationary seal ring, but the present invention is not limited thereto. For example, the opening portion and the fluid supply groove may be formed in the rotating seal ring or may be respectively formed in the rotating seal ring and the stationary seal ring.

Further, in each of the above-described embodiments, it has been described that the opening portion and the fluid supply groove are arranged at four or eight equal intervals, but the present invention is not limited thereto. For example, the number of arrangement is not limited. Further, it is preferable that the opening portion and the fluid supply groove be arranged at equal intervals in the circumferential direction, but it does not matter.

Further, in each of the above-described embodiments, it has been described that the annular opening concave portion is formed, but the present invention is not limited thereto. For example, the annular opening concave portion may not be formed.

Further, in each of the above-described embodiments, it has been described that the annular opening concave portion is formed to be continuous in the circumferential direction, but the present invention is not limited thereto. For example, a plurality of opening concave portions may be formed. That is, the annular opening concave portion may not be continuous in the circumferential direction.

{REFERENCE SIGNS LIST}

| | |
|---|---|
| 3 | Rotating seal ring (sliding component) |
| 6 | Stationary seal ring (sliding component) |
| 10 | Fluid circulation path |
| 11 | Opening portion |
| 11c | Circumferential end portion (circumferential end) |
| 11d | Circumferential end portion (circumferential end) |
| 12 | Fluid supply groove |
| 15 | Annular opening concave portion |
| 60 | Outer peripheral edge portion |
| 60a | Outer peripheral edge (peripheral edge on opening portion side) |
| 61 | Inner peripheral edge portion |
| 111 | Opening portion |
| 121 to 124 | Fluid supply groove |
| 106 | Stationary seal ring (sliding component) |
| 110A, 110B | Fluid circulation path |
| 111 | Opening portion |
| 111a | Wall |
| 124 | Fluid supply groove |
| 124a | Wall |
| 203 | Rotating seal ring (sliding component) |
| 206 | Stationary seal ring (sliding component) |
| 210 | Fluid circulation path |
| 211 | Opening portion |
| 212 | Fluid supply groove |
| 215 | Annular opening concave portion |
| 300 | Protruded Wall Portion |
| 61a | Inner peripheral edge (peripheral edge on opening portion side) |
| D | Depth |
| Lu | Lubricant (fluid) |
| M | Mechanical seal |
| S3 | Sliding surface |
| S6 | Sliding surface |
| S106 | Sliding surface |
| S203 | Sliding surface |
| S206 | Sliding surface |

The invention claimed is:

1. A pair of sliding components disposed at a relatively rotating position to face each other when a rotating machine is driven, wherein at least one sliding surface of the pair of sliding components provided with a plurality of first opening portions each of which is formed on an outer peripheral edge portion of the at least one sliding surface, arranged in a circumferential direction and opened to an outer diameter side space of the at least one sliding surface, and a plurality of first fluid supply grooves each of which is disposed between adjoining two of the opening portions, and has a first end portion communicating with one of the adjoining two of the first opening portions and a second end portion communicating with remaining one of the adjoining two of the first opening portions, the first end portion and the second end portion of the first fluid supply groove being opposed to each other in the circumferential direction, wherein the first fluid supply grooves and the first opening portions constitute a first fluid circulation path which is continuous in an annular shape in the circumferential direction, wherein the at least one sliding surface of the pair of sliding components provided with a plurality of second opening portions each of which is formed on the outer peripheral edge portion of the at least one sliding surface, arranged in the circumferential direction so as to be shifted from the first opening portions and opened to the outer diameter side space of the at least one sliding surface, and a plurality of second fluid supply grooves each of which is disposed between adjoining two of the second opening portions, and has a first end portion communicating with one of the adjoining two of the second opening portions and a second end portion communicating with remaining one of the adjoining two of the second opening portions, the first end portion and the second end portion of each of the second fluid supply grooves being opposed to each other in the circumferential direction, wherein the second fluid supply grooves and the second opening portions constitute a second fluid circulation path which is continuous in an annular shape in the circumferential direction, wherein the first fluid circulation path and the second fluid circulation path are crossed at a plurality of points, wherein first side wall surfaces partially defining the first fluid circulation path and facing toward an outer diameter side are collectively formed in a polygon or Reuleaux polygon shape constituted by straight lines, curved lines or a combination of straight lines and curved lines in a plan view, and wherein second side wall surfaces partially defining the second fluid circulation path and facing toward an outer diameter side are collectively formed in another polygon or Reuleaux polygon shape constituted by straight lines, curved lines or a combination of straight lines and curved lines in a plan view.

* * * * *